United States Patent
Mittal et al.

(10) Patent No.: US 10,248,693 B2
(45) Date of Patent: Apr. 2, 2019

(54) MULTI-LAYERED ROW MAPPING DATA STRUCTURE IN A DATABASE SYSTEM

(71) Applicant: SAP SE, Walldorf (DE)

(72) Inventors: Rahul Mittal, Pune (IN); Amit Pathak, Pune (IN)

(73) Assignee: SAP SE, Walldorf (DE)

( * ) Notice: Subject to any disclaimer, the term of this patent is extended or adjusted under 35 U.S.C. 154(b) by 422 days.

(21) Appl. No.: 15/140,195

(22) Filed: Apr. 27, 2016

(65) Prior Publication Data
US 2017/0316002 A1    Nov. 2, 2017

(51) Int. Cl.
*G06F 17/30* (2006.01)
*G06F 12/02* (2006.01)

(52) U.S. Cl.
CPC ...... *G06F 17/3048* (2013.01); *G06F 17/3033* (2013.01); *G06F 12/0238* (2013.01); *G06F 17/30368* (2013.01)

(58) Field of Classification Search
None
See application file for complete search history.

(56) References Cited

U.S. PATENT DOCUMENTS

| | | | |
|---|---|---|---|
| 9,569,356 B1* | 2/2017 | Wei | G06F 12/0261 |
| 2007/0016582 A1* | 1/2007 | Kawamura | G06F 17/30312 |
| 2007/0016612 A1* | 1/2007 | James | G06F 19/705 |
| 2008/0313213 A1* | 12/2008 | Zhang | G06F 17/30592 |
| 2012/0296883 A1* | 11/2012 | Ganesh | G06F 17/30315 707/693 |
| 2017/0163575 A1* | 6/2017 | Wang | H04L 49/9094 |
| 2017/0193043 A1* | 7/2017 | Li | G06F 17/30445 |

* cited by examiner

*Primary Examiner* — Jau Shya Meng
(74) *Attorney, Agent, or Firm* — Fountainhead Law Group P.C.

(57) ABSTRACT

A multi-layer data structure is configured to access rows, pages, and locks stored in memory of a database. The multi-layer data structure may include a row mapping table configured to convert a row identifier of a row in the database into a row address of the row to be accessed stored in a cache memory. The row mapping table may be used to compare bits of the row identifier with corresponding bits of the row address in the cache memory. Each layer of multi-layer row mapping table can be configured to store certain of the bits oldie row address and the row address can be determined by comparing the bits of the row address with the corresponding bits of the row identifier at each layer of the data structure.

23 Claims, 12 Drawing Sheets

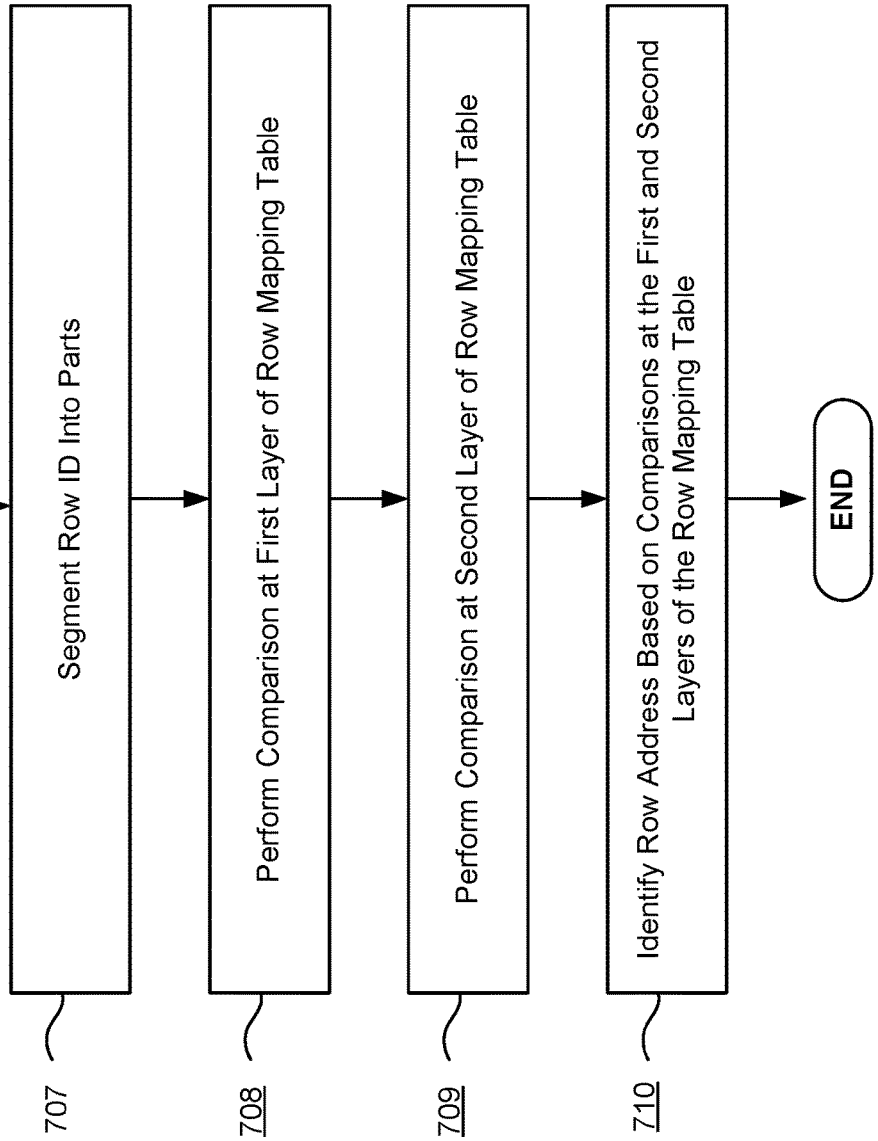

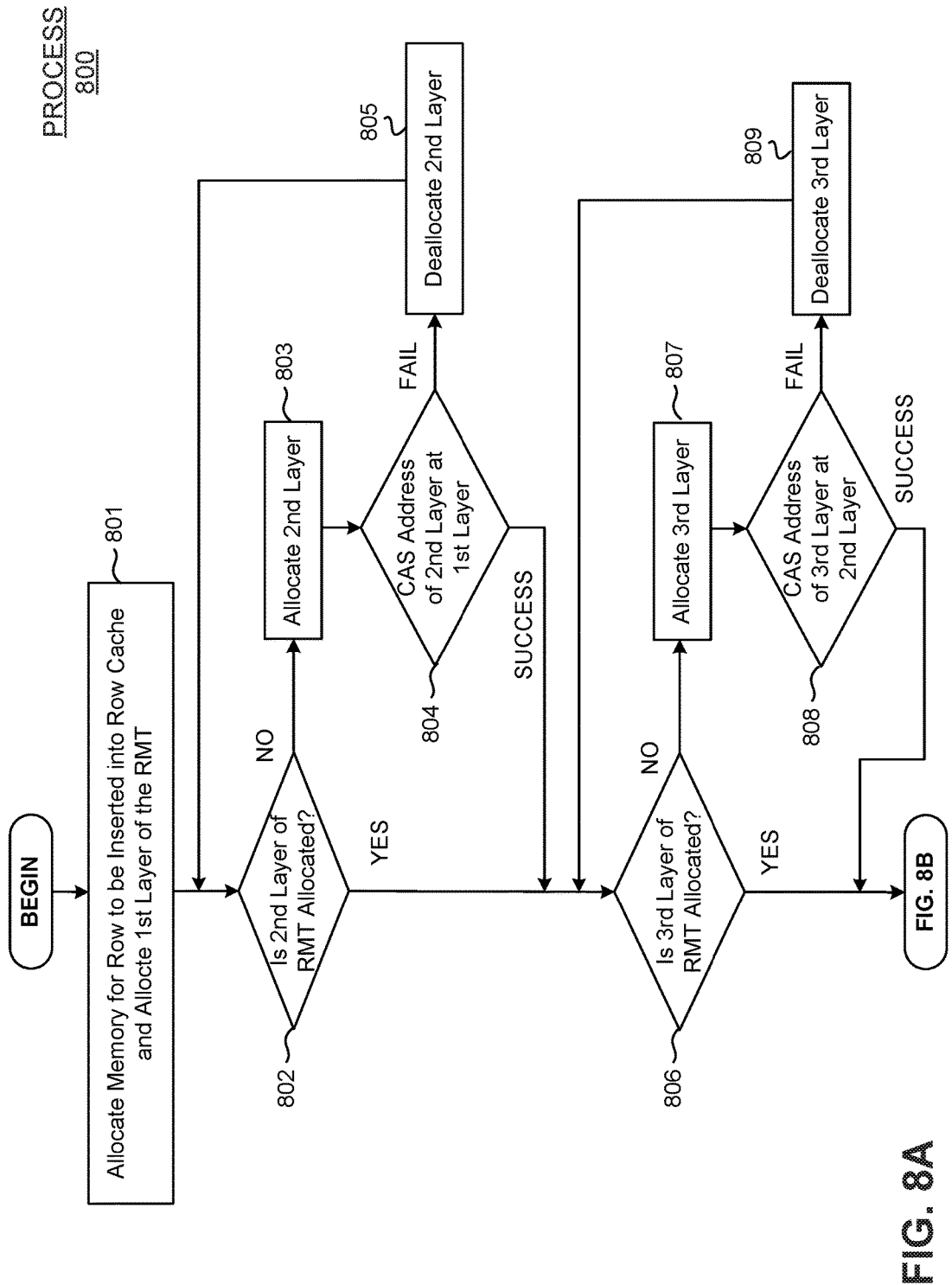

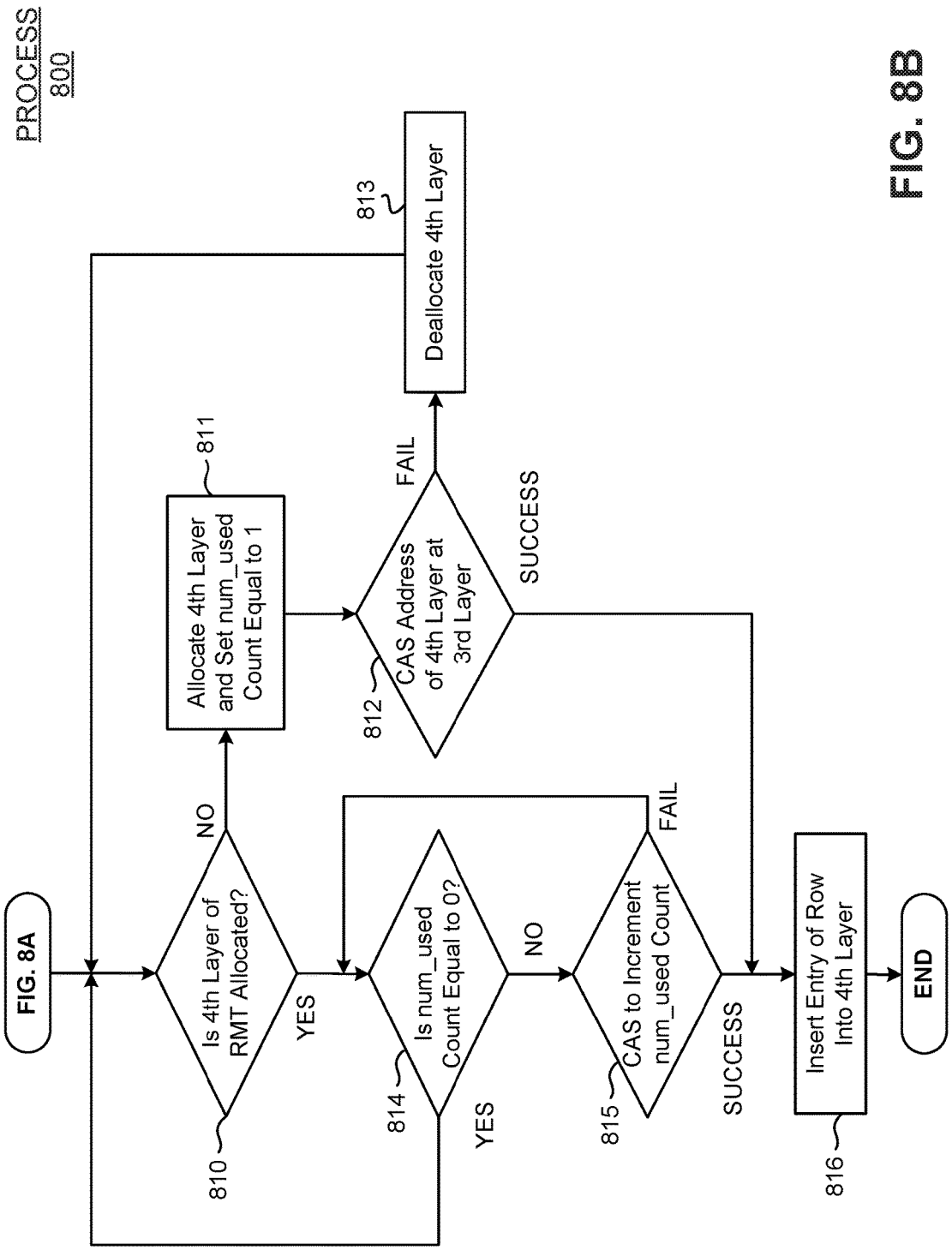

US 10,248,693 B2

MULTI-LAYERED ROW MAPPING DATA STRUCTURE IN A DATABASE SYSTEM

TECHNICAL FIELD

At least certain embodiments disclosed herein relate generally to database access management, and particularly to using a data structure for mapping data in a database system.

BACKGROUND

Conventional database access systems may utilize a page-based buffer caching mechanism for storing recently accessed data for performing operations in a database. The operation may include, for example, insert, delete, update, or select operations. Unfortunately, buffer cache memories (or "buffer caches") suffer from a number of inefficiencies relating to data access latency and memory optimization that restrict database performance. Some of the issues impacting performance of a database buffer cache include contention caused by the buffer latches at the buffer input/output (I/O) pins, increased data flow latency for hard disk access operations (i.e., from/to hard disk), and pinning/unpinning of buffers in accordance with the rules of write-ahead logging to maintain database consistency. These drawbacks lead to increasingly poor and unpredictable performance as the amount of data stored in the database increases.

In addition, conventional buffer caches rely upon hash tables for data access and search operations. But hash tables require a sequential scan of an entire overflow chain for each hash container, which becomes more expensive as the overflow chain becomes longer with every addition of new entries. Further, hash table mechanisms used in buffer caches are configured to compare search keys for every element in the overflow chain, which requires additional memory space for storing the key values for each element as well as the additional latency required to perform the comparison of the key values at every element of the overflow chain. Hash tables also have no limits on cache misses as overflow chains could be very long. Cache misses cause degradation in performance.

In addition, buffer caches require implementation of locks at each bucket in the hash table for searching and updating the hash table. This makes it difficult to scale or to provide a highly concurrent environment in which multiple operations are being performed at the same time. Finally, buffer caches require a large data structure to facilitate the database accesses which wastes memory space.

SUMMARY

The embodiments described herein include improved methods, systems and computer readable media for mapping rows in a database system comprising a database server in communication with one or more data storage devices.

The following detailed description and accompanying drawings provide a better understanding of the nature and advantages of the present disclosure.

BRIEF DESCRIPTION OF THE DRAWINGS

For a better understanding of at least certain embodiments, reference will be made to the following detailed description, which is to be read in conjunction with the accompanying drawings.

FIGS. 7A-7B depict flow charts illustrating an example embodiment of a process for mapping data in a data server in communication with a database system according to the techniques described in the present disclosure.

FIGS. 8A-8B depict a flow chart of an example process embodiment configured for inserting rows into a row cache memory according to the techniques described in the present disclosure.

DETAILED DESCRIPTION

Figure 1:
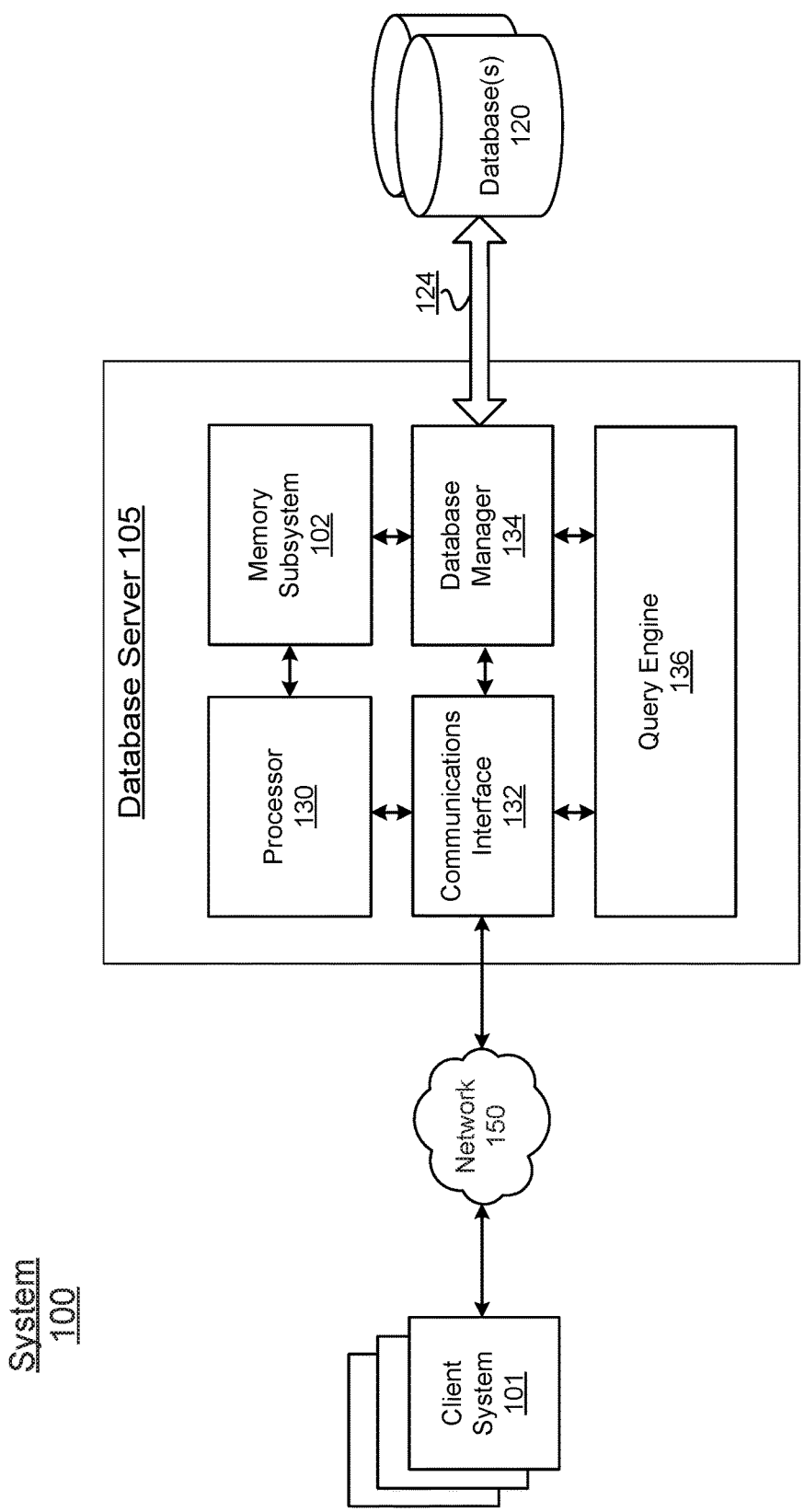
FIG. 1 depicts a conceptual block diagram of an example embodiment of a database system upon which the embodiments described in the present disclosure may be implemented.

Throughout the description, for the purposes of explanation, numerous specific details are set forth in order to provide a thorough understanding of the present disclosure. It will be apparent to one skilled in the art, however, that the techniques described herein may be practiced without some of these specific details. In other instances, well-known structures and devices may be shown in block diagram form to avoid obscuring the principles and techniques described herein.

Conventionally, data pages of a database are stored in a buffer cache and are accessed via one or more hash tables. The techniques described in the disclosure avoid using hash tables as a mapping data structure for accessing data in a page buffer cache because of the many disadvantages of doing so discussed above. The embodiments described in this disclosure are adapted to replace conventional hash table data structures with a multi-layered data structure configured for accessing data in a database more efficiently and with a more simplified design. In particular, one embodiment of the present disclosure comprises a lockless and memory-efficient row mapping data structure (e.g., database table) of a database, which is configured to facilitate better performance for data access operations such as, for example, INSERT, SELECT, UPDATE, and DELETE operations (collectively "ISUD" operations).

Prior solutions implementing a hash table mechanism for mapping data objects in a database were limited to mapping data at the page level (where each page comprises one or more rows). As used in this disclosure, the term "row mapping data structure" refers to a multi-layer data structure stored in memory that is capable of accessing data in a database at the row level of granularity (i.e., it can access individual rows of pages of allocated memory). The row mapping data structure accomplishes this by converting a unique row identifier into a row addresses of a cache memory configured to store data at the row level of granularity. This cache memory is referred to in this disclosure as a "row cache memory" or "row cache" since it is capable of storing individual rows. In one example embodiment, the row mapping data structure may comprise a row mapping table.

It should be noted that, although the "row mapping data structure" is capable of accessing rows stored in the row cache at row-level granularity, the row mapping data structure is also capable of being configured to access data at any level of granularity in a database, such as, for example, at the "page" level, "extent" level, or "allocation unit" level. These various levels are referred to in this disclosure as "layers" of the row mapping data structure and are discussed in detail below.

The row mapping data structure can also be configured to access data objects stored in memory at multiple different levels of granularity by traversing the layers of the row mapping data structure. For example, the row mapping data structure can be configured to access both rows in a row cache memory and pages in a page buffer cache memory. The row mapping data structure is configured to receive a unique identifier and to map the unique identifier (e.g., row identifier, page identifier, etc.) to an address of a particular object in memory (e.g., row, page, etc.). The row mapping data structure can also access objects of type "lock" (described below) configured for locking data objects while an ISUD operation is being performed on them.

Accessing data from the row cache helps bypass the inefficiencies involved with a buffer cache as discussed above. The embodiments described in this disclosure can be adapted to take the rows from data pages stored in the database and store them separately in the row cache. The row cache of the present disclosure works in conjunction with a conventional buffer cache. The row cache can be accessed separately from the data pages in the buffer cache. A row that resides in the row cache may thus be present somewhere in the page buffer cache, but accessing the row can be performed in the row cache.

Recently accessed data (referred to as "hot data") from the database, or more specifically, the rows that are "hot" with respect to the ISUD operations, may be stored in the row cache, leaving other less frequently accessed ("colder") rows in a conventional page buffer cache. Although a copy of the row remains stored in the buffer cache, it is not accessed because it may be stale at various times. Instead, when a row in the row cache becomes cold, the latest copy of the row can be written back to the page buffer cache, and the row can then be removed from the row cache. This process may be referred to as "packing" the row into the buffer cache, and may be done in a background task or operation.

In order to uniquely identify a row in a database, a unique row identifier (or "row ID") may be associated with every row. The unique row identifier may be stored in indexes of a database and utilized to map the rows within the database. While the embodiments described herein are configured to map rows within a database, the rows can also be mapped within any other data structure associated with a database system. For example, the row mapping data structure may be used to map rows within one or more physical or virtual databases, or any other data structures within a database, such as database tables or indexes.

The row identifier may be stored in various log records used for runtime rollback and undo-redo phases of boot time and crash recovery database operations. In at least certain embodiments, the row identifier does not change throughout the lifetime of a particular row since changing the row identifier can be an expensive operation—the row identifier needs to be updated in every index that references that row. Changing the row identifier may also cause difficulties for parallel recovery operations. There are many components within a database system that may be designed to work with rows on the basis of row identifiers.

According to embodiments, given a particular row identifier, the system can be configured to first determine whether the corresponding row is present (i.e., currently stored in) in the row cache memory; and if it is, the system is further configured to obtain the address of the row stored in the row cache. The speed of the conversion from a row identifier to a row address affects the performance of the ISUD operations because ISUD operations perform this conversion to access a particular row in the database table.

At least certain embodiments described herein, are advantageous over conventional systems because, among other things, (1) the row mapping data structure used in the embodiments are predictable and independent of the amount of data stored in the data structure, (2) the row mapping data structure is scalable in highly concurrent systems where row entries may be, currently inserted, deleted, and searched by multiple ISUD operations running in parallel at the same time, (3) the amount of memory space required by the row mapping data structure is minimal compared to conventional systems, and (4) the implementation of the row mapping data structure is relatively simple compared to complex hash table mechanisms of prior solutions.

I. Exemplary Systems

Provided below is a description of an example system upon which the embodiments described in this disclosure may be implemented. Although certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner.

In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks.

FIG. 1 depicts a conceptual block diagram of an example embodiment of a database system upon which the embodiments described in this disclosure may be implemented. The database server 105 includes a processor, a memory subsystem 102, a communications interface 132, a database manager 134, and a query engine 136. In the illustrated embodiment, one or more client computer systems 101 are in communication with a database server computer 105 over one or more communications networks 150. The database server 105 is also in communication with one or more databases 120 via one or more communications links 124.

The client system 101 may be configured to communicate with database server 105 over one or more communication networks 150 via the communications interface 132 in order to access data for ISUD operations. The database server 105 can be configured to perform data accesses operations on data stored in the database 120 via one or more communications links 124. The database server 105 may be implemented as an individual computer hardware server or as an array of computer hardware servers logically coupled together and working in a functionally coordinated manner. Generally, a database server comprises a system configured to perform data access operations with respect to data stored in one or more repositories of data (e.g., database(s) 120). Depending on the type of database server, data operations may range from simple operations, such as storing and retrieving data, to more complex operations such as calculating statistics based on the data, or arranging, modifying, or formatting data.

In the depicted embodiment, the processor 130 of the database server 105 is configured to communicate with the memory subsystem 102 to store and retrieve data for performing operations of the database server 105. The processor 130 can be configured to receive client communications over the network 150 at the communications interface 132. The processor 130 can also be configured to transmit communications to the client systems 101 over the network 150 from the communications interface 132.

As will be appreciated by persons of skill in the art, network(s) 150 may be implemented as a single wired or wireless network, or multiple separate networks in communication with one another. Network(s) 150 may be implemented as any wired or wireless network(s). For example, the networks 150 described herein can be implemented as a local area network ("LAN"), wide-area network ("WAN"), combination of LANs and WANs, the Internet, or any other type of communication network adapted for communicating electronic messages and information. Further, network(s) 150 may be implemented as a physical array of hardware resources or as a virtual array, or any combination thereof. Network(s) 150 may also be implemented in a cloud-based network configuration. For example, network(s) 150 may be implemented as public or private cloud network, or combination thereof. No specific network or network architecture should be construed as limiting the embodiments and techniques described herein.

In FIG. 1, the database server 105 is in communication with one or more databases 120 adapted to store data. In one embodiment, the database server 105 may be in remote communication with the databases 120 via one or more communication links or networks 124. Alternatively, database 120 may be a component of the database server 105 and configured to communicate with the database server 105 via a direct or indirect connection or network 124. In addition, the database(s) 120 may be implemented as any type of database system. One example embodiment includes a relational database system in which data is stored in structured database tables (or other data structures) comprised of rows and columns, and accessed through data storage rules (or schemas). Other examples of database systems include database systems where data can be stored in a semi-structured or unstructured format.

The database server 105 further includes a database manager 134. The database manager 134 may be configured as a general-purpose database management system ("DBMS") that communicates with the one or more databases 120 for the purposes of storing and retrieving data to or from the databases 120. A DBMS may be configured as a computer software application that interacts with the database and other applications or users to capture and analyze data. For example, a DBMS may be designed to allow for definition, creation, querying, update, and administration of databases 120. The database manager 134 may comprise an integrated set of computer hardware and software programs that allow client systems 101 to interact with the databases 120 to provide access to data. In addition, the database manager 134 may provide various functions that allow entry, storage, and retrieval of large quantities of information, and provide a mechanism to manage how the information is organized in the databases 120.

In the illustrated embodiment, the database manager 134 is in communication with the query engine 136 of the database server 105. In one embodiment, the database manager 134 and the query engine 136 may be configured as separate components within the database server 105. In other embodiments, the query engine 136 may be a component of the database manager 134, or otherwise integrated with the database manager 134. The query engine 136 may be configured to receive and process queries from the client systems 101.

A database "query" may comprise a request for data or information from a database table or combination of database tables (or other data structures) in the database. Queries are the mechanism for retrieving information from a database and generally consist of questions presented to the database in a predefined format. This data may be generated as results returned by a structured query language ("SQL"), or as pictorials, graphs or complex results, e.g., trend analysis from data-mining tools. Many database management systems use the SQL standard query format.

The database server 105 also includes one or more memory subsystems 102 in communication with one or more processors 130 of the database server 105 via one or more communication mediums, such as an interconnect bus. The memory subsystem 102 may be configured to store information and instructions to be executed by the one or more processors 130, including information and instructions for performing the techniques described in this disclosure. The memory subsystem 102 may also be used for storing programs executed by the processor 130. The memory subsystem 102 may include multiple memory components of different types, including random access memory ("RAM"), read only memory ("ROM"), flash memory, cache memory, memory buffers, and/or disk-based memory, or combination thereof, etc.

The memory subsystem 102 may also comprise a disk-based storage device (see FIG. 2), such as a hard disk, for storing information and instructions. Typically such a storage device comprises nonvolatile memory. Common forms of such storage devices include, for example, a hard drive, a magnetic disk, an optical disk, a CD-ROM, a DVD, a flash memory or other non-volatile memory, a universal serial bus ("USB") memory card, or any other computer-readable medium from which a computer can read computer data and instructions.

Figure 2:
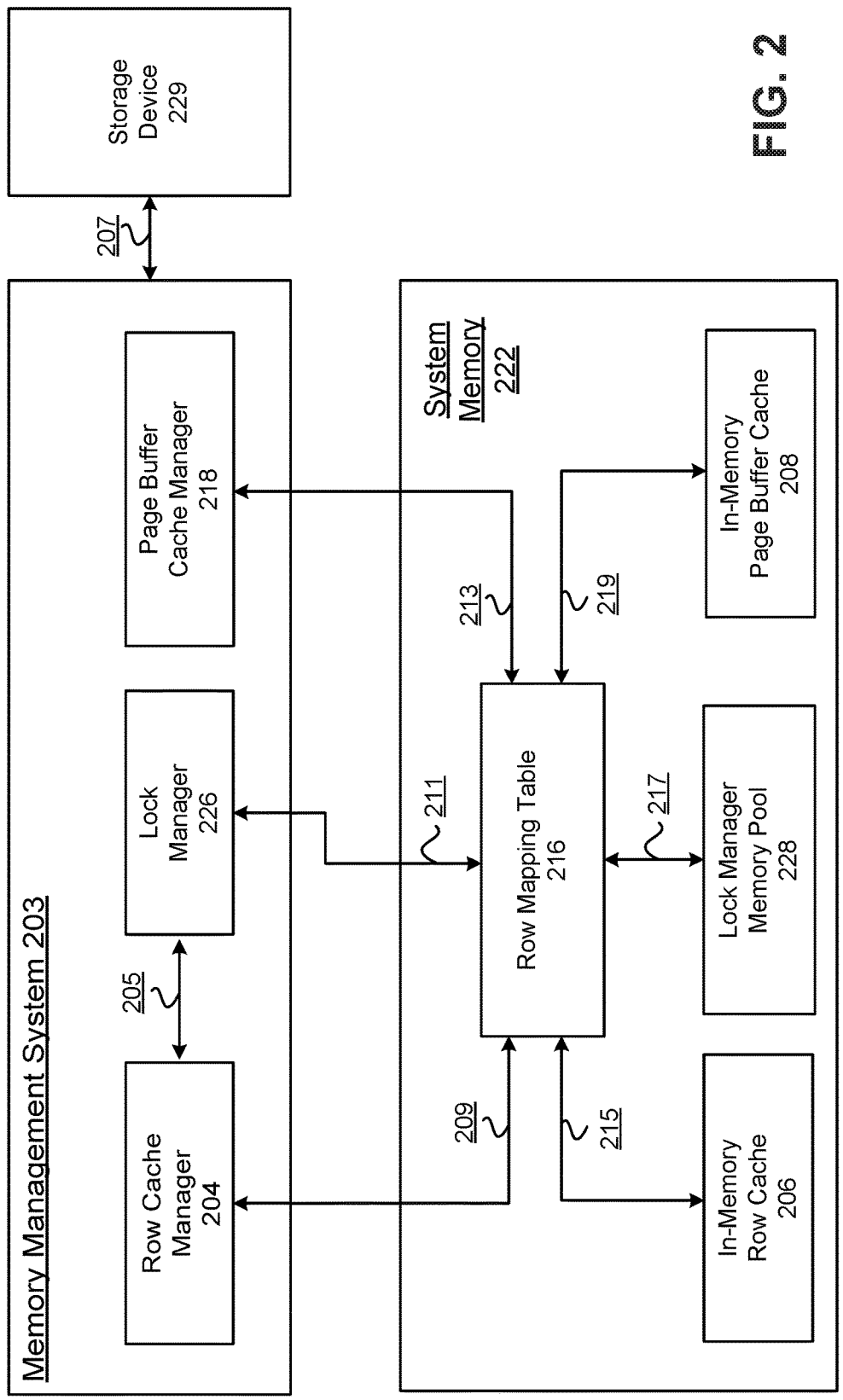
FIG. 2 depicts a conceptual block diagram of an example embodiment of a memory subsystem configured according to the techniques described in the present disclosure.

FIG. 2 depicts a conceptual block diagram of an example embodiment of a memory subsystem configured according to the techniques described in the present disclosure. In the illustrated embodiment, the memory subsystem 202 includes a memory management system 203 in communication with a system memory 222. The memory management system 203 includes a row cache manager 204, a page buffer cache manager 218, and a lock manager 226. The system memory 222 is configured to store a row mapping table 216, an in-memory row cache 206, an in-memory page buffer cache 208, and a lock manager memory pool 228.

In one embodiment, access to the in-memory row cache 206 can be managed by the row cache manager 204, access to the in-memory page buffer cache 208 can be managed by the page buffer cache manager 218, and access to the lock manager memory pool 228 can be managed by the lock manager 226. The row cache manager 204 is configured to access the row mapping table 216 stored in system memory 222 via communications link 209, the lock manager 226 is configured to access the row mapping table 216 via communications link 211, and the page buffer cache manager 218 is configured to access the row mapping table 216 via communications link 213. The row cache manager 204 is also in communication with the lock manager 226 via communications link 205.

As further depicted in this example, the row mapping table 216 is configured to (1) access data from the in-memory row cache 206 via communications link 215, (2) access data from the in-memory page buffer cache 208 via communications link 219, and (3) access data from the lock manager memory pool 228 via communications link 217.

The row cache 206 may be configured to store rows of a database table separately from the rows stored in the pages of a page buffer cache 208. In at least certain embodiments, the row cache 206 and the buffer cache 208 may be implemented in the memory of the database server as "in-memory" data structures. As is well known in the art, in-memory database systems ("IMDB"; also referred to as a main memory database system or "MMDB" or memory resident database) are database management systems that primarily rely on main memory for data storage. Main memory database systems are generally faster than disk-based database systems because the internal optimization algorithms are simpler and execute in fewer CPU cycles. In addition, accessing data in memory 222 eliminates the time necessary for querying data from disk, which provides faster and more predictable performance than disk-based operations. For applications where response time is critical, in-memory database systems are often preferred. Other embodiments, however, are not limited to in-memory database systems or data structures.

The row cache manager 204 can be configured to implement and manage the row mapping table 216 (or other functionally similar data structure) to optimize access to the rows stored in the in-memory row cache 206 according to the techniques described in this disclosure. As discussed above, the in-memory row cache 206 may be configured to store recently accessed rows of a database system. As discussed above, the row mapping table 216 may comprise a multi-layer data structure stored in memory 222 that is configured to convert unique row identifiers into row addresses of the rows to be accessed in the in-memory row cache 206. The row mapping table 216 may also be configured to convert a row identifier of a row to be accessed in the database into an address of the page that stores the row in the in-memory page buffer cache 208.

Once the row address is determined based on the mapping provided by the row mapping table 216, it may then be determined whether the row is located in the in-memory row cache 206. If the row at the row address is located in the row cache 206, the system may be configured to perform the ISUD operation on the particular row, and then to store a result of the operation back into the row cache 206 at the row address.

The row identifier may comprise multiple bits, which may be segmented into multiple subparts, each subpart comprising one or more of the multiple bits. The row mapping table 216 may comprise multiple layers, where each layer may comprise one or more elements, and each element may store multiple entries. Each entry at each layer of the row mapping table 216 may comprise a subset of the bits of a row address of a row stored in the row cache 206. In order to convert the row identifier into a row address of a row to be accessed in the row cache 206, the bits of each subpart of the row identifier can be compared with corresponding bits at each layer of the row mapping table 216 to determine the row address of the row to be accessed in the row cache 206. Each entry at each layer of the row mapping table 216 may be compared to the bits of the corresponding subpart of the row identifier to determine if there is a match. Once a match is found, the row address of the row in the row cache 206 may be identified to perform the data access.

When a particular row is not located in the row cache 206, however, the memory management system 203 can be configured to determine whether the row is located in the page buffer cache 208 based on the row identifier. In one embodiment, the page buffer cache 208 is configured to store pages comprising rows of the database (or other data structure) that are accessed less frequently than the rows stored in the row cache 206. When a row to be accessed is not located in the in-memory row cache 206, but is located in the in-memory page buffer cache 208, the page buffer cache manager 218 may be configured to access the row by determining the address of the page buffer cache 208 with the help of the row mapping table 216. The result of the operation may be stored in row cache 206.

In an alternate embodiment, the page buffer cache manager 218 may store the result of the ISUD operation in both the row cache 206 and the page buffer cache 208. One reason for this is because once a row has been accessed, it is considered recently accessed, e.g., "hot", and can therefore be copied into the row cache 206 so that it can be accessed in a future ISUD operation on the row in a shorter time. The row may also be updated in the page buffer cache 208. In one embodiment, the row may be further updated in disk storage device 219 of the memory subsystem 202.

In cases where the row to be accessed is not located in either the row cache 206 or the page buffer cache 208, a disk operation may be performed to access the row from disk memory. In particular, a disk access operation can be performed to access the row from the disk storage device 229. The storage device 219 can communicate with the memory management system 203 via one or more communication links 207. Because a disk access operation has a longer latency than accessing data from memory 222, recently accessed data can be copied from the disk storage device 229 and stored in the row cache 206 for faster access times.

In another embodiment, the recently accessed data may be copied from the disk storage device 229 into both the row cache 206 and the page buffer cache 208 so that the next time the data is accessed, it can be provided from the row cache 206; or if the row is not stored in the row cache 206, it can be accessed from the page buffer cache 208. In at least one embodiment, accessing the row cache 206 is faster than accessing the page buffer cache 208 because the page buffer cache 208 resides at a cache memory level located further away in proximity from the processor 130 of the database server.

A lock manager 226 may also be provided that works on the row identifiers of the rows making it a logical locking mechanism instead of expensive physical locking mechanism of conventional methods. The lock manager 226 can be configured to cause a row identifier or a row currently being accessed by a data access operation to be stored into the lock manager memory pool 228. This prevents other data access operations from accessing the same row until the previous operation has completed. The lock manager 226 can be consulted by processes desiring to perform operations on a particular row to determine if that row is already in use and is locked. The lock manager 226 indicates the locked rows stored in the lock manager memory pool 228. The lock manager 226 may consult the row mapping table 216 to find the address of the required lock stored in the lock manager memory pool 228.

Figure 3:
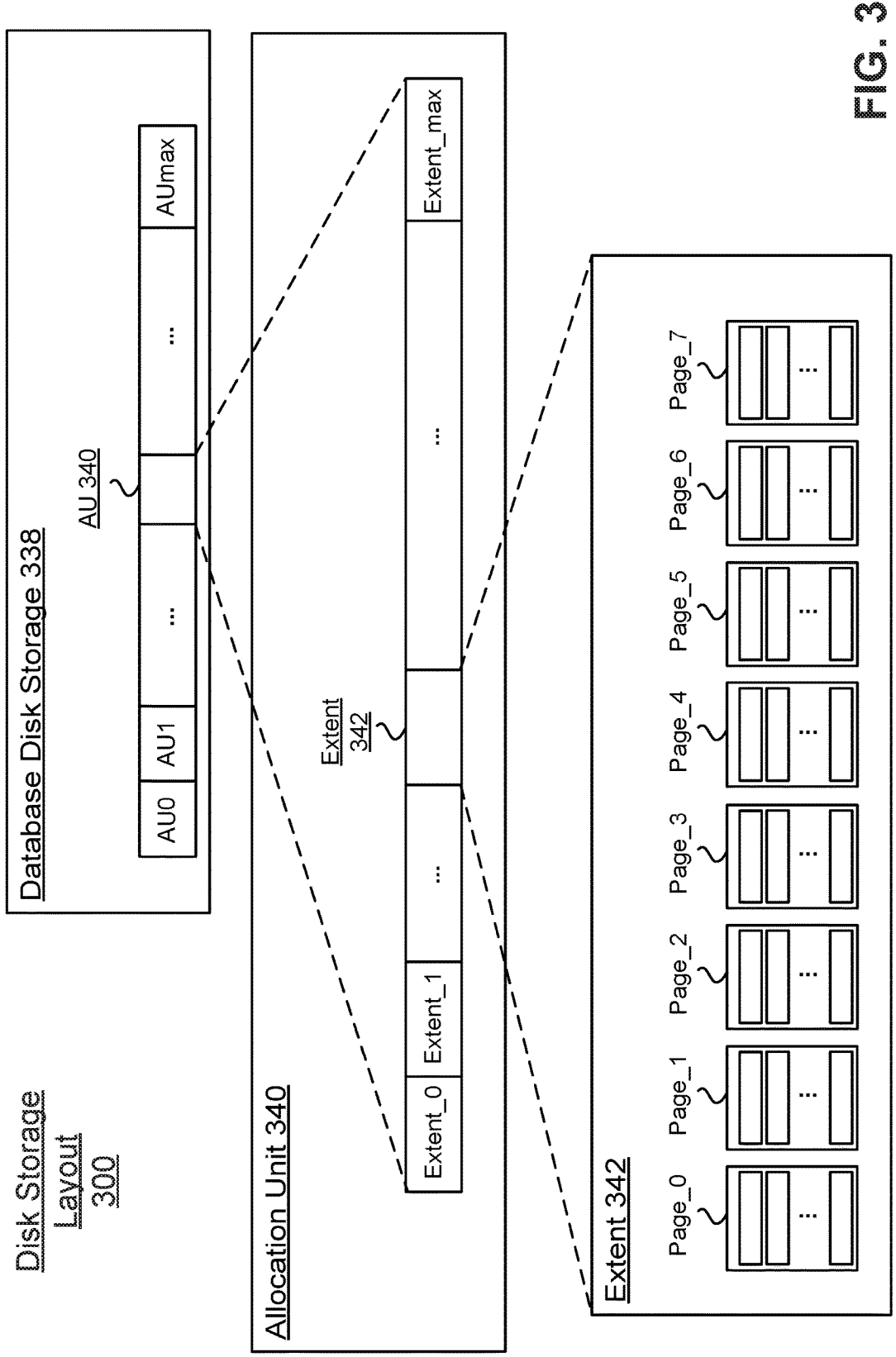
FIG. 3 depicts a conceptual block diagram of an example embodiment of a database disk storage layout configured according to the techniques described in the present disclosure.

FIG. 3 depicts a conceptual block diagram of an example embodiment of a database disk storage layout configured according to the techniques described in the present disclosure. The data stored in the database system of the present disclosure may be divided into pages that store data in rows. In one embodiment, a partition may be allocated a set of eight (8) consecutive pages at a time. This partitioned set of eight consecutive pages may be referred to herein as an "extent". In addition, a set of 32 consecutive extents may comprise an "allocation unit" ("AU"). In one embodiment, the entire storage of the database system may be divided into a set of $2^{24}$=16,777,216 allocation units on disk. It should be noted however that the embodiments described in this disclosure are not limited to any particular grouping of the data stored in the database. In other embodiments, fewer or more layers and/or partitions may be used.

In the illustrated embodiment, disk storage layout 300 includes database disk storage 338 that represents the entire storage of the database system. In this embodiment, the database disk storage 338 includes a set of allocation units AU0, AU1 . . . , AU340, . . . AUmax. Each of these allocation units may comprise multiple extents. As shown, allocation unit 340 comprises a set of extents extent_0, extent_1, . . . extent_342, . . . , extent_max. Each of these extents may comprise multiple pages comprising rows of data stored in the database system. As shown, extent 342 comprises page_0 through page_8. Other embodiments may include fewer or more pages for each extent.

In a preferred embodiment, the row identifier is unique to each row stored in the pages of the database. That is, each row identifier maps to a single unique row of the database. The mapping, in one embodiment, may be accomplished using a row mapping table. As discussed above, the row mapping table may be configured to convert the row identifier of the row to be accessed into a row address of the row cache. And, if the row to be accessed is not located in the row cache, the row mapping table may also be configured to convert the row identifier into a page address of the page buffer cache discussed above to access the row on a page-by-page basis. Once accessed, the row in the page from the page buffer cache can then be copied into the row cache.

Figure 4:
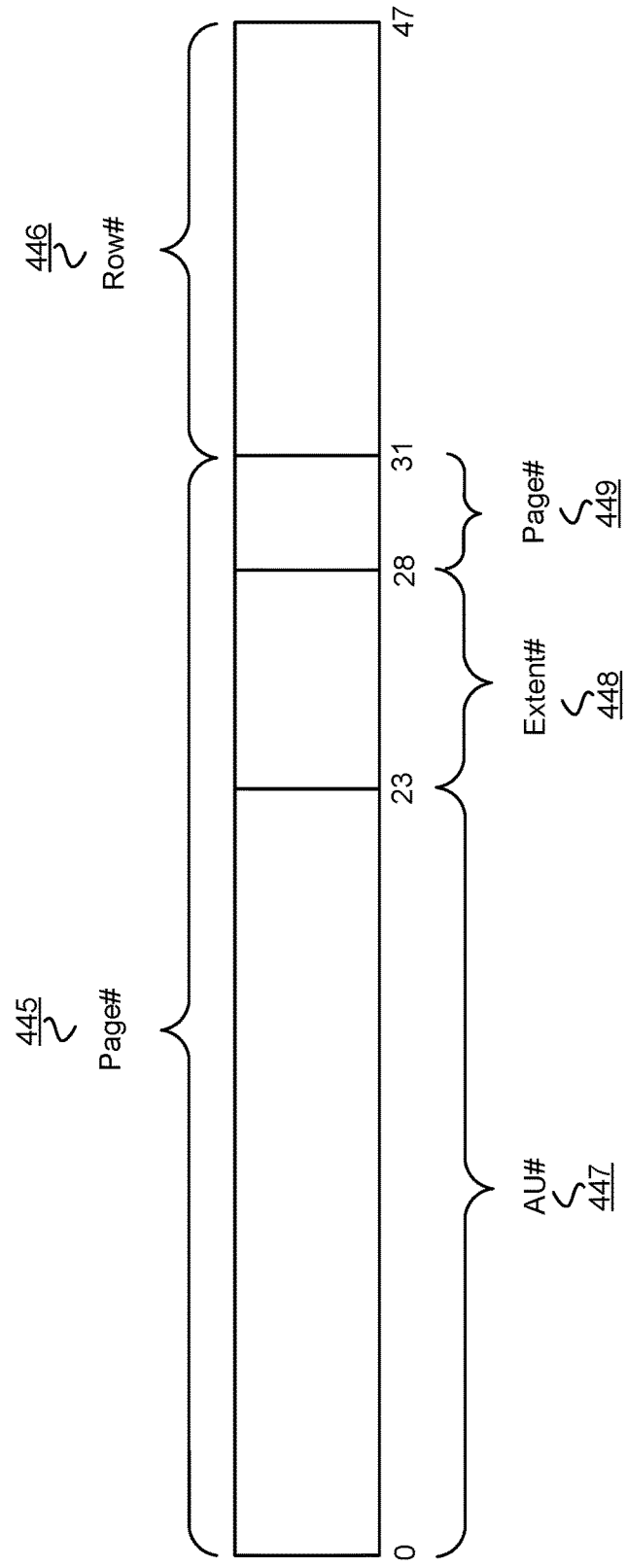
FIG. 4 depicts a conceptual block diagram of an example embodiment of a row identifier data structure configured according to the techniques described in the present disclosure.

FIG. 4 depicts a conceptual block diagram of an example embodiment of a row identifier data structure configured according to the techniques described in the present disclosure. In the illustrated embodiment, Row ID structure 400 includes a page number identifier field 445 and a row number identifier field 446. In one embodiment, the Row ID may comprise a 48-bit structure. As shown, the first 32 bits of the Row ID structure 400 uniquely identify a page number in the database and the remaining 16 bits of the Row ID structure 400 uniquely identify a row number within the page identified by the first 32 bits. In addition, within the 32-bit page number identifier, the first 24 bits identify an allocation unit number AU 447 in the database, the next 5 bits identify an extent number 448 out of 32 extents within the allocation unit 447, and the final 3 bits identify a page number 449 out of the eight pages of the extent 448. The row number 446 identifies the row number within page 449.

The bits of the Row ID 400 corresponding to each of the subparts of the row identifier (including the allocation unit number 447, the extent number 448, and the page number 449) can be compared with corresponding bits at each layer of the multi-layer row mapping table to convert the row identifier into a row address of a row to be accessed in the row cache. In other embodiments, the row identifier can comprise a different arrangement or grouping of bits corresponding to a different arrangement or grouping of data stored in the row cache. The embodiments described in this disclosure are not limited to any particular set or grouping of bits of the row identifier 400, nor are the embodiments limited to any particular number of bits within each such set or grouping of the row identifier bits. Any two or more groups or sets of bits can be used for the row identifier, each group or set including any number of corresponding bits.

Conventional buffer cache memories utilize hash tables to internally convert the page number part of a row identifier into the address of the page that stores the row of the database table in the page buffer cache. As discussed above, utilizing a buffer cache with a hash table mapping mechanism has a number of disadvantages. Embodiments described in this disclosure avoid use of a hash table, and instead utilize a row mapping table data structure configured to perform the mapping of the row identifier of the database table into a row address of the row to be accessed in the row cache.

Figure 5:
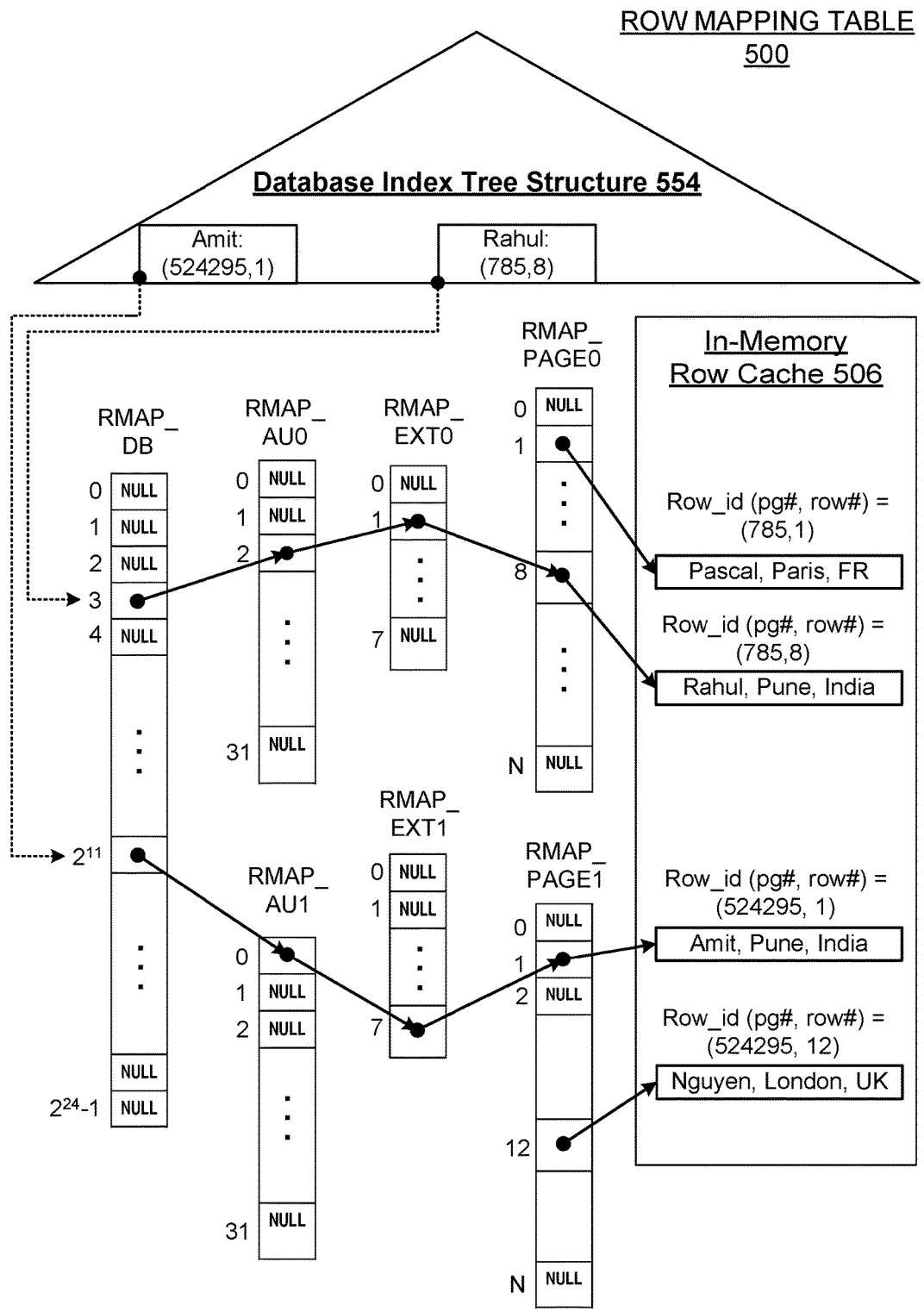
FIG. 5 depicts a conceptual block diagram of an example embodiment of a row mapping data structure configured to access a row cache memory according to the techniques described in this disclosure.

FIG. 5 depicts a conceptual block diagram of an example embodiment of a row mapping data structure configured to access a row cache memory according to the techniques described in this disclosure. The illustrated embodiment includes a database index tree structure 554. The database index tree structure 554 can be logically coupled to, and in communication with, the row mapping table 500. The database index tree structure 554 may also be referred to as a "B-tree" index. A B-tree index can be used to scan a database (or a data structure within the database, or one or more databases, or virtual databases) on one or more keys. In this case, the index is scanned on the "name" key and the values returned by the scan include "Amit" and "Rahul". The database index tree structure 554 can be scanned and the corresponding values of the row identifiers can be thus obtained. As shown, the name key "Amit" corresponds to page number 1031 and row number 1 (row identifier (1031, 1)) and the name key "Rahul" corresponds to page number 758 and row number 8 (row identifier (758, 8)).

In this embodiment, the row mapping data structure 500 comprises four (4) layers including a database layer comprising a RMAP_DB element, an allocation unit layer comprising RMAP_AU0 and RMAP_AU1 elements, an extent layer comprising RMAP_EXT0 and RMAP_EXT1 elements, and a page layer comprising RMAP_PAGE0 and RMAP_PAGE1 elements. Embodiments of the row mapping table 500, however, are not limited to any particular number of layers or elements for the data structure. In one embodiment, the multi-layer row mapping data structure 500 may comprise two or three layers. In other embodiments the row mapping data structure 500 may comprise more than four layers.

In the illustrated embodiment, the elements of the row mapping table 500 are configured hierarchically in descending order from left to right starting from the database layer (element RMAP_DB) down to the page layer (elements RMAP_PAGE0 and RMAP_PAGE1). Each element at each layer of the row mapping table 500 may include multiple entries. In this example embodiment, at the database layer, the RMAP_DB element includes a set of $2^{24}$ entries representing the number of allocation units stored in the database. At the allocation unit layer, the elements RMAP_AU0 and RMAP_AU1 each include a set of 32 entries representing the number of extents stored in the allocation unit elements RMAP_AU0 and RMAP_AU1, respectively. At the extent layer, the elements RMAP_EXT0 and RMAP_EXT1 each include a set of 8 entries representing the number of pages stored in the extent elements RMAP_EXT0 and RMAP_EXT1, respectively. And at the page layer, the elements RMAP_PAGE0 and RMAP_PAGE1 each include a set of N entries representing the number of rows stored in the page elements RMAP_PAGE0 and RMAP_PAGE1, respectively.

The number of rows N in the page elements RMAP_PAGE0 and RMAP_PAGE1 may depend on the maximum number of rows that can be accommodated on a page of the database. As rows are added to the row cache 506, additional entries corresponding to the added rows can be initialized in RMAP_PAGE0 with the address of the row in row cache 506, and as rows are removed from the row cache 506, the corresponding entries in RMAP_PAGE0 can be uninitialized.

Each entry at each layer of the row mapping table 500 can initially store a null value. When a row is stored in the row cache 506 at a row address, corresponding entries of the layers of the row mapping table 500 corresponding to the row address can store a reference (i.e., pointer) to a next entry in a next layer of the row mapping table 500 hierarchy from the database layer down to the page layer.

In one embodiment, a count referred to in this disclosure as "num_used" may be associated with each element of each of the layers of the multi-layer row mapping table. The num_used count may be stored in a separate entry (not shown) for each of the elements of the layers of the row mapping table 500. When a row entry is inserted into the row mapping table 500, the num_used count can be incremented in a corresponding entry at each layer of the row mapping table 500, and when a row entry is removed from the row mapping table 500, the num_used count can be decremented in the corresponding entry at each layer of the row mapping table. The num_used count signifies the number of entries used in a particular element in a particular layer of the row mapping table.

Each of the layers of the row mapping table 500 can be traversed to convert the row identifier into the row address of the in-memory row cache 506 in order to access the row. More particularly, bits stored at the layers of the row mapping table 500 associated with the respective entries can be compared on a bit-wise basis with corresponding bits of the row identifier to determine a match at each layer of the row mapping table 500. If a matching entry is found at the layers that correspond to a particular row address of a row stored in the row cache 506, the row can be accessed in the row cache 506 for performing the designated ISUD operation.

In the illustrated embodiment, the row identifier (524295, 1) associated with key name "Amit" corresponds to (1) allocation unit number $2^{11}$ at the RMAP_DB layer of the row mapping table, (2) extent number 0 at the RMAP_AU1 layer, (3) page number 7 at the RMAP_EXT1 layer, and (4) row number 1 at the RMAP_PAGE1 layer, which references (i.e., points to) the row corresponding to "Amit, Pune, India" stored in the row cache 506. Likewise, the row identifier (785, 8) associated with key name "Rahul" corresponds to (1) allocation unit number 3 at the RMAP_DB layer of the row mapping table, (2) extent number 2 at the RMAP_AU0 layer, (3) page number 1 at the RMAP_EXT0 layer, and (4) row number 8 at the RMAP_PAGE0 layer, which references the row corresponding to "Rahul, Pune, India" stored in the in-memory row cache 506.

At times when the row to be accessed is cold, e.g., has not been accessed within a predetermined time duration, the row may no longer be stored in the row cache 506, and will need to be accessed from the buffer cache memory.

Figure 6:
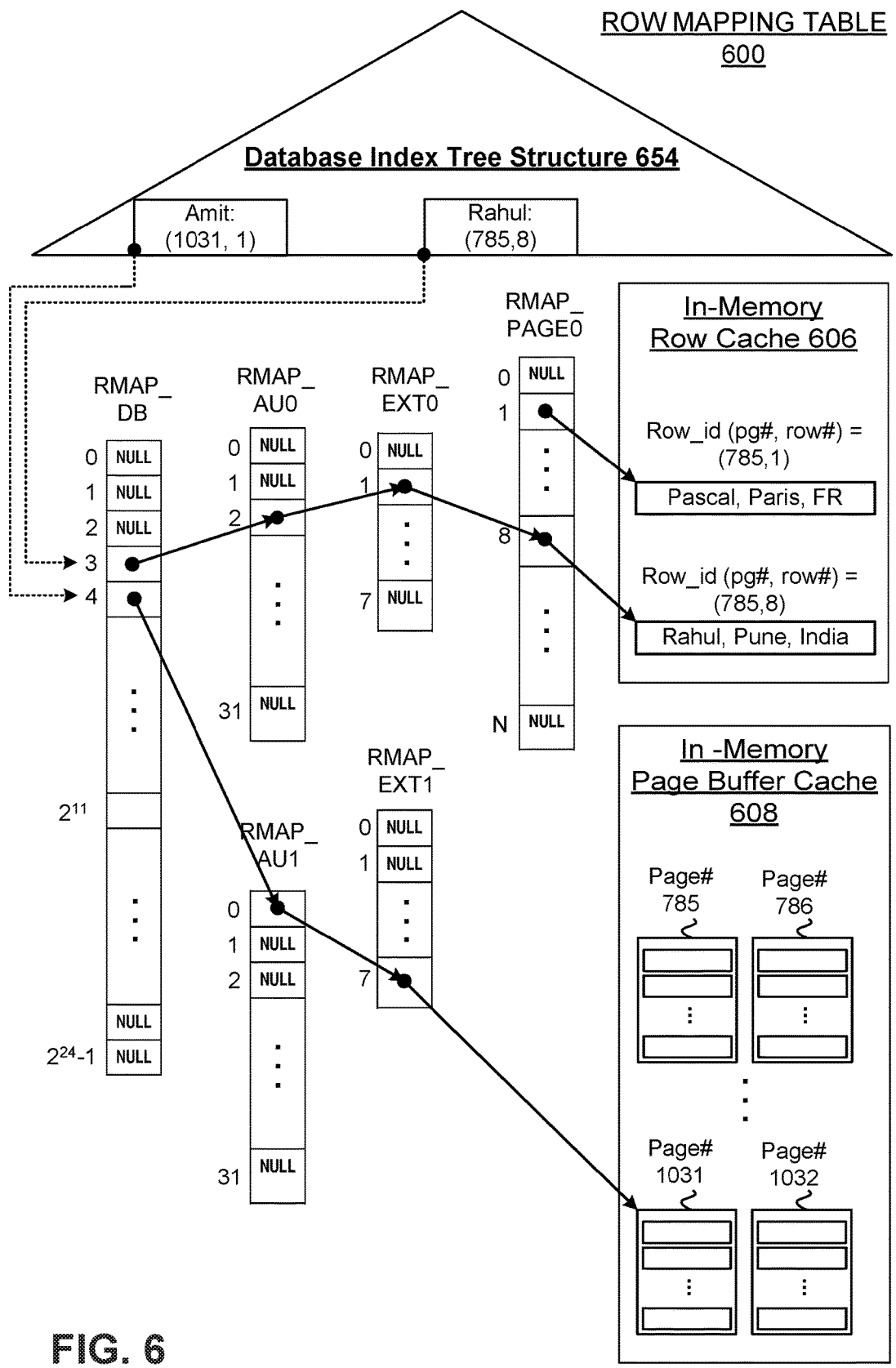
FIG. 6 depicts a conceptual block diagram of an example embodiment of a row mapping data structure configured to access both a row cache and a page buffer cache according to the techniques described in this disclosure.

FIG. 6 depicts a conceptual block diagram of an example embodiment of a row mapping data structure configured to access both a row cache memory and a page buffer cache memory according to the techniques described in this disclosure. As in FIG. 5 above, this embodiment includes a database index tree structure 654 that can be logically coupled to, and in communication with, the row mapping table 600. The row mapping data structure 600 can be configured to access both the in-memory row cache 606 and the in-memory page buffer cache 608 as shown.

In this embodiment, the row mapping table 600 comprises four (4) layers for accessing rows in the in-memory row cache 606 including the database layer element RMAP_DB, the allocation unit layer element RMAP_AU0, the extent layer element RMAP_EXT0, and the page layer element RMAP_PAGE0. The row mapping table 600 further comprises three (3) layers for accessing pages in the in-memory page buffer cache 608 as shown, including the database layer element RMAP_DB, the allocation unit layer element RMAP_AU1, and the extent layer element RMAP_EXT1.

In this embodiment, the database layer element RMAP_DB includes a set of $2^{24}$ entries representing the number of allocation units in the database. At the allocation unit layer, elements RMAP_AU0 and RMAP_AU1 each include a set of 32 entries representing the number of extents in the allocation unit elements RMAP_AU0 and RMAP_AU1, respectively. At the extent layer, elements RMAP_EXT0 and RMAP_EXT1 each include a set of eight entries representing the number of pages in the extent elements RMAP_EXT0 and RMAP_EXT1, respectively. And at the page layer, element RMAP_PAGE0 includes a set of N entries representing the number of rows in the page element RMAP_PAGE0. Note there is no page layer element RMAP_PAGE1 in row mapping table 600. This is because pages, not individual rows, are accessed from the in-memory buffer cache 608 as shown.

The number N of rows at the RMAP_PAGE0 layer may depend on the maximum number of rows that can be accommodated on a page of the database. As rows are added to the row cache 606, additional entries corresponding to the added rows are initialized in RMAP_PAGE0 with the address of the row in row cache 606, and as rows are removed from the row cache 606, the corresponding entries in RMAP_PAGE0 are uninitialized. In one embodiment, when a row entry is inserted in the row mapping table 600, a num_used count is incremented in the corresponding entry at each layer of the row mapping table 600, and when a row entry is removed from the row mapping table 600, the num_used count is decremented in the corresponding entry at each layer of the row mapping table 600.

Each of the layers of the row mapping table 600 can be traversed to convert the row identifier into the row address of the row stored in the in-memory row cache 606 in order to access the row. The first three layers of the row mapping table 600 can also be traversed to convert the row identifier into a page number storing the row to be accessed in the in-memory buffer cache 608. More particularly, bits stored at the layers of the row mapping table 600 associated with the respective entries can be compared on a bit-wise basis with corresponding bits of the row identifier to determine a match at each layer of the row mapping table 600.

One of the advantages of the embodiments described in this disclosure is that the row identifier is not stored anywhere in the row mapping data structure 600, which is required when using a hash table and requires a much larger data structure. Instead, the row identifier is divided into four (4) layers in this example. Another example advantage is that because of the configuration of the row mapping table 600, the number of bit-wise comparisons required at each layer of the row mapping table 600 is limited to the number of layers, which in this example is equal to 4. Hash tables can potentially require as many comparisons as there are identifiers stored in the hash table. Thus hash tables do not have a cap on the number of bitwise comparisons to be performed to access a data object in memory. Additionally, there is a cap on the number of cache misses using the techniques described in this disclosure because of the fixed number of layers in the row mapping table 600.

After performing the bitwise comparisons between the bits of the row identifier and the corresponding bits at the various different layers of the row mapping table 600, if a match is found that corresponds to the row address of a row stored in the row cache 606, the row can be accessed for performing the designated ISUD operations. The result of the operation can then be stored back into the row cache 606 at the row address.

If, no matching row address is found, then the row cache manager 204 of the database system can be configured to determine that the row is not located in the in-memory row cache 606. In such a case, control can pass to the page buffer cache manager 218 of the database system to traverse the three layer elements (RMAP_DB, RMAP_AU1, and RMAP_EXT1) of the row mapping table 600 to determine if a matching page number is stored in the page buffer cache 608. If so, the corresponding row can be accessed from the page in the page buffer cache 608 for performing the designated ISUD operation. The result of the operation can then be placed into the row cache 606 and allocated a new row address. In one embodiment, the result of the operation can also be stored back into the page buffer cache 608 at the page number of the page the row is stored in.

In the illustrated embodiment, the row identifier (785, 8) associated with key name "Rahul" corresponds to (1) allocation unit number 3 at the RMAP_DB layer element of the row mapping table 600, (2) extent number 2 at the RMAP_AU0 layer element, (3) page number 1 at the RMAP_EXT0 layer element, and (4) row number 8 at the RMAP_PAGE0 layer element, which references the row corresponding to "Rahul, Pune, India" stored in the row cache 606. Likewise, the row identifier (1031, 1) associated with key name "Amit" corresponds to (1) allocation unit number 4 at the RMAP_DB layer element of the row mapping table 600, (2) extent number 0 at the RMAP_AU1 layer element, and (3) page number 7 at the RMAP_EXT1 element layer, which references the corresponding page stored in the page buffer cache 608.

In at least certain embodiments, a single row mapping table, such as those depicted in FIGS. 5-6, can be configured to store and access addresses for the rows stored in the row cache, the pages stored in the page buffer cache, or the locks stored in the lock manager memory pool. In such an embodiment, the single row mapping table can access rows, pages or locks based on the type of identifier received (i.e., row identifier, page identifier, or lock identifier).

II. Exemplary Processes

The following figures depict example flow charts illustrating various embodiments of a process for mapping data in a database server in communication with a database system according to the techniques described in this disclosure. It is noted that the processes described below are exemplary in nature and are provided for illustrative purposes and not intended to limit the scope of the disclosure to any particular example embodiment. For instance, methods in accordance with some embodiments described herein may include or omit some or all of the operations described below, or may include steps in a different order than described herein. The particular methods described are not intended to be limited to any particular set of operations exclusive of all other potentially intermediate operations.

In addition, the operations may be embodied in computer-executable code, which causes a general-purpose or special-purpose computer to perform certain functional operations. In other instances, these operations may be performed by specific hardware components or hardwired circuitry, or by any combination of programmed computer components and custom hardware circuitry.

Figure 7A:
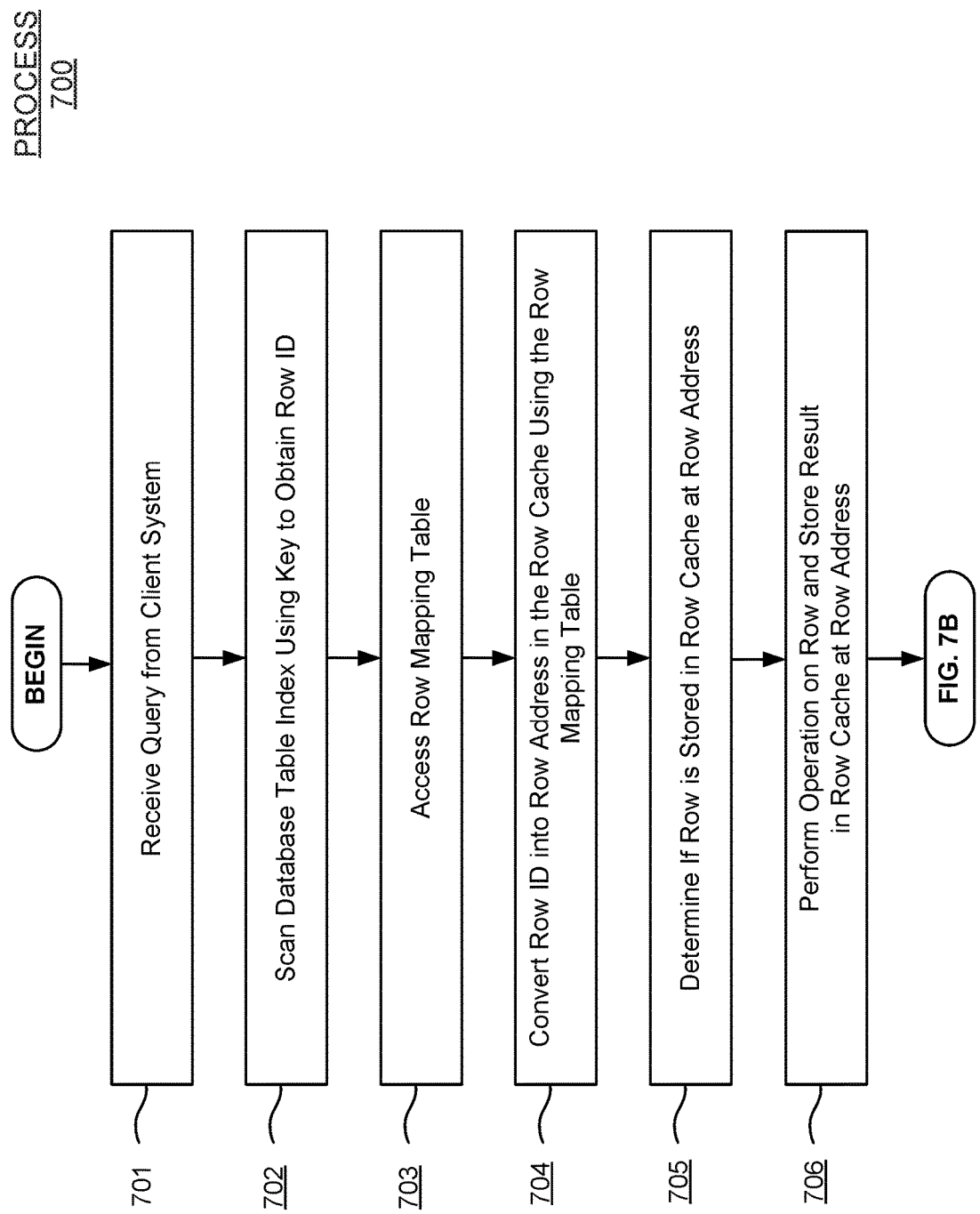

FIGS. 7A-7B depict flow charts of example embodiments of a process for mapping data in a data server in communication with a database system. FIG. 7A depicts a flow chart of an example embodiment of a process for mapping data in a database system. In the illustrated embodiment, process 700 begins at operation 701 by receiving a query from a client system via a network. The query may comprise a key and an operation to be performed, such as an ISUD operation, on data stored in a database. Process 700 continues by scanning an index of the database using the key to obtain a row identifier for the row to be accessed (operation 702). In one embodiment, the index of the database may include a B-tree index that may be scanned on a search key contained in the query.

Process 700 continues by accessing a row mapping table comprising a multi-layer data structure stored in a memory of the database server in response to the query (operation 703). In one embodiment, the row mapping table may be configured to convert the row identifier into a row address of the row stored in a row cache memory of the database server. The row cache memory may be configured to store recently accessed (e.g. hot) rows of the database. Process 700 can then be configured to convert the row identifier of the row to be accessed in the database into the row address of the row in the row cache using the row mapping table (operation 704). A determination can then be made as to whether the row to be accessed in the database is located in the row cache memory based on the row address (operation 705), and if so, the operation can be performed on the row and a result of the operation can be stored back into the row cache at the row address (operation 706).

Process 700 continues at FIG. 7B, which depicts further details of the process 700. At operation 707, in order to convert the row identifier into the row address of the row (see operation 704 of FIG. 7A) the row identifier can be segmented (e.g., broken down) into at least two parts. In one embodiment, as discussed above, a first part of the row identifier can include the page number of the page to be accessed and a second part can include the row number of the row to be accessed. But this is given by way of explanation and not of limitation since the row identifier may be segmented into any number of subparts for the mapping operations described in this disclosure.

Process 700 continues by performing a first comparison at an element of a first layer of the row mapping table (operation 708). In one embodiment, this may include performing a bit-wise comparison of the bits of the first part of the row identifier with the bits of a corresponding first part of the row address of the row stored in the row cache memory that are stored in an element of the first layer of the row mapping table. For example, the bits of the first part of the row identifier may comprise the page number of the page that stores the row to be accessed in the row cache. The bit-wise comparison includes comparing the bits of the page number in the row identifier with corresponding bits of the row address stored in the first layer element.

Process 700 can then perform a second comparison at an element of a second layer of the row mapping table (operation 709). In one embodiment, the second comparison may include comparing bits of the second part of the row identifier with bits of a corresponding second part of the row address of the row stored in the row cache memory. For example, the bits of the second subpart of the row identifier may comprise the row number of the row stored in the page identified by the first bit-wise comparison operation above. The bit-wise comparison includes comparing the bits of the row number in the row identifier with bits stored in the corresponding second part of the row address stored in the second layer element. The row address of the row stored in the row cache can then be identified based on the first comparison and the second comparison (operation 710).

In one embodiment, the row identifier can be segmented into more than two parts. For example, as above, the row identifier can be segmented into a plurality of allocation units, each allocation unit storing multiple sets of pages, each set of pages storing multiple pages, and each page storing multiple rows of the database.

In cases where the particular row has not been accessed for a period of time, the row may have been removed from the row cache and copied into the page buffer cache. As discussed above, the page buffer cache may be configured to store pages comprising rows of the database accessed less frequently than the rows stored in the first cache memory. If the row to be accessed is not located in the row cache memory, the page buffer cache can next be checked to determine if the row is located in the buffer cache memory. In one embodiment, the row cache and the buffer cache can be implemented as in-memory data structures stored in the memory of the database server.

If the row is located in the buffer cache memory, the ISUD operation can be performed on the page stored in the page buffer cache and the result of the operation can be stored in memory of the database server. In one embodiment, the result of the ISUD operation can be copied into the row cache memory at a newly allocated row address. In other embodiments, the result of the operation can be stored into both the row cache memory and the page buffer cache memory to update the page buffer cache with current data.

As discussed previously, when the row is not located in either the row cache memory or buffer cache memory, the system may perform a disk access operation to access the row from a hard disk of the database server, perform the operation on the row, and store a result of the operation in the row cache, and optionally, in the page buffer cache as well. In one embodiment, rows can be removed from the row cache and stored in the page buffer cache when the rows have not been accessed within a first time period, and rows can be removed from the page buffer cache and stored onto hard disk when the rows have not been accessed within a second time period longer than the first time period.

This completes process 700 according to one illustrative embodiment. Pseudo code for scanning (e.g., searching) a row mapping table as in process 700 is included in an Appendix A at the end of this disclosure.

In one embodiment, the row mapping table is configured to expand as new rows are inserted into the row cache and to contract when rows are removed from the row cache and "packed" into the buffer cache. Caching or inserting a new row into the row cache involves insertion of an entry corresponding to that row into the row mapping table.

Concurrency Control and Collision Avoidance

Embodiments of the present disclosure support a scalable, highly concurrent database system where row identifiers may be inserted, deleted, or searched concurrently among thousands of tasks running in parallel at the same time. In such embodiments, conflicts between concurrent accesses to rows in the row cache memory may need to be arbitrated. Without a concurrency control algorithm, an inserting process that is adding an entry into the row cache whose memory has already been deallocated, for example, may cause memory corruption by writing to a memory location that has been deallocated. In addition, a search operation could become erratic if it is attempting to read a deallocated page, for example.

In one embodiment, concurrency control can be accomplished by maintaining a count at each layer of the row mapping table indicating the number of entries allocated in the layer's data structure. The count can be incremented when new rows are allocated to the row cache memory and can be decremented when rows are deallocated from the row cache memory. The importance of the "count" field is that it helps mitigate concurrency conflicts between deallocating and inserting processes.

The following description explains four potential concurrency conflicts and how the embodiments described in this disclosure are configured to resolve them.

Insert-Insert Concurrency

For caching a particular row in the row cache, there is a row-level lock on the row during the operation, so no concurrency conflicts can arise. One process controls the row-level lock at a time. But if more than one task is trying to cache different rows belonging to the same allocation unit, extent or page, a race condition may arise between these processes. This case may be solved by requiring allocating processes to assert compare and swamp ("CAS") while installing their pointers in the previous row mapping table layer. For further details, see the CAS used in the pseudo code in Appendix A at line numbers 27, 43 and 68.

Delete-Delete Concurrency

Delete-delete concurrency is also not an issue because of the row-level lock placed on the row while the row is being removed from the row cache. But while more than one task is removing an entry from a page layer data structure, e.g., RMAP_PAGE, leading to zero entries remaining, a race condition may arise as to who amongst these task is authorized to send the page layer data structure to the garbage collector. In one embodiment, this case is resolved using the counter on the page layer data structure such that whatever process brings the count to zero is responsible to send the page layer data structure to the garbage collector, and can also be responsible for nullifying its corresponding entry in the allocation layer data structure, e.g., RMAP_AU.

Search and Insert/Delete Concurrency

A search operation for a row into the row mapping table that occurs immediately before that row is inserted into the row cache may result in reading a copy of the row from the buffer cache. A scan at lower isolation level is acceptable to read an uncommitted row or a certain committed version of the row from the buffer cache. But if the scan is at higher isolation level, it can acquire the row-level lock, and only then probe into the row mapping table to retrieve a consistent copy of the row. The same applies to search and delete concurrency, before a row is removed from the row cache and its corresponding entry from the row mapping table, the latest version of the row can be copied into the buffer cache. So, if the search operation comes in just before removal, it can obtain the latest copy from row cache; and if it comes in just after removal, it can obtain the latest copy of the row from buffer cache.

While a task is performing a search on the row mapping table, holding the page layer data structure, e.g., RMAP_PAGE, pointer that it obtained from the extent layer RMAP_EXT, another task might be trying to remove the page layer data structure from the row mapping table because it just nullified the last entry contained in it. In at least one embodiment, the row level data structure is not deallocated right away; instead, the page layer data structure is sent to a garbage collector ("GC"), which can deallocate it only once all tasks that are (or might be) holding a pointer to the page layer data structure are removed from the system. This can prevent reading from a deallocated page layer data structure, e.g., RMAP_PAGE.

Insert-Delete Concurrency

Allocation and deallocation of the page layer data structure can be handled by maintaining the count discussed above. At the time of allocation of page layer data structure, e.g., RMAP_PAGE, and insertion of the first entry into it, the inserting process, before installing the page layer data structure into the extent layer data structure, e.g., RMAP_EXT, can set the value of count to one (1) even though the data structure as yet does not already have an entry in it. As a result, even if new insertions and deletions happen into this page level data structure, the count can never become zero, and, hence until the first inserting process inserts its entry into the page layer data structure, the entry cannot be deallocated by a different process. For further details, see the pseudo code in Appendix A line numbers 62-68.

On the other hand, once a deleting operation brings down the count to zero, no inserting operation can insert a new entry into this page; and neither can any inserting operation allocate a new page layer data structure for the same page number until the deleting process nullifies its entry from the extent layer data structure, e.g., RMAP_EXT. For further details, see the pseudo code in Appendix A line numbers 138-149.

Further details on the concurrency control algorithm are described with reference to FIGS. 8A-8B, which depict a flow chart of an example process embodiment configured for inserting rows into a row cache memory according to the techniques described in the present disclosure. In the illustrated embodiment of FIG. 8A, the row insertion process 800 begins at operation 801 where memory for the row to be inserted in the row cache and a first layer of the row mapping table ("RMT") are allocated. In one embodiment, the first layer of the row mapping table may correspond to the database layer.

Process 800 continues by determining if a second layer of the row mapping table is allocated (operation 802). In one embodiment, the second layer of the row mapping table may correspond to the allocation unit layer. If the second layer of the row mapping table is allocated, control flows to operation 806 discussed below. If not, the second layer is allocated at (operation 803) and a compare and swap ("CAS") with a retry mechanism is initiated (at operation 804). In particular, at operation 804 a CAS is provided to the second layer's address stored at the corresponding entry at the first layer. If the CAS fails, the second layer is deallocated (operation 805) and control flows back to operation 802 to retry allocating the second layer of the row mapping table for the row to be inserted into the row cache.

If the CAS succeeds, control flows to operation 806 where it is determined if a third layer of the row mapping table has been allocated. In one embodiment, the third layer of the row mapping table comprises the extent layer. If the third layer of the row mapping table has been allocated, control flows to FIG. 8B discussed below. If not, the third layer is allocated at (operation 807) and the CAS with a retry mechanism is initiated (at operation 808). In particular, at operation 808 a CAS is provided to the third layer's address stored at the corresponding entry at the second layer. If the CAS fails, the third layer can be deallocated (operation 809) and control flows back to operation 806 to retry allocating the third layer of the row mapping table for the row to be inserted into the row cache. If the CAS succeeds, control flows to FIG. 8B.

Process 800 continues at FIG. 8B, which depicts further details of the process 800. In particular, FIG. 8B depicts further details of managing the num_used count at each layer of the row mapping table. The details described in this embodiment, including especially those at operations 811, 814 and 815, can also be used for the first, second, and third layers of the row mapping table of FIG. 8A.

At operation 810, it is determined if a fourth layer of the row mapping table has been allocated. In one embodiment, the fourth layer of the row mapping table comprises the page layer. It should be noted that the process 800 described in this disclosure involves a row mapping table comprising four layers; but as discussed previously, the embodiments can include fewer or more layers. Process 800 in such cases is modified accordingly.

If the fourth layer of the row mapping table has already been allocated, control flows to operation 814 discussed below. If not, the fourth layer is allocated at operation 811. In addition, in this embodiment the num_used count associated with the fourth layer can be set equal to 1 (indicating a newly allocated layer). Process continues by providing a CAS to the fourth layer's address stored at the corresponding entry in the third layer of the row mapping table (operation 812). If the CAS fails, the fourth layer is deallocated (operation 813) and control flows back to operation 810 to retry allocating the fourth layer of the row mapping table for the row to be inserted into the row cache. If the CAS succeeds on the other hand, control flows to operation 816 discussed below.

Once the fourth layer of the row mapping table has been allocated, it is determined whether the num_used count is equal to 0 (operation 814). If so, this means that process 800 is trying to access an element in a layer of the row mapping table that has been deallocated by another process running in the system. In such a case, control flows back to operation 810 and the process repeats until the fourth layer of the row mapping table is allocated and the num_used count is greater than 0.

When the num_used count is greater than 0, control flows to operation 815 where a CAS is provided to increment the num_used count. If the CAS fails, control flows back to operation 814 and the process repeats. If the CAS succeeds in incrementing the num_used count, control flows to operation 816 where the entry of the row is inserted into the fourth layer. This completes process 800 according to one illustrative embodiment.

Figure 9:
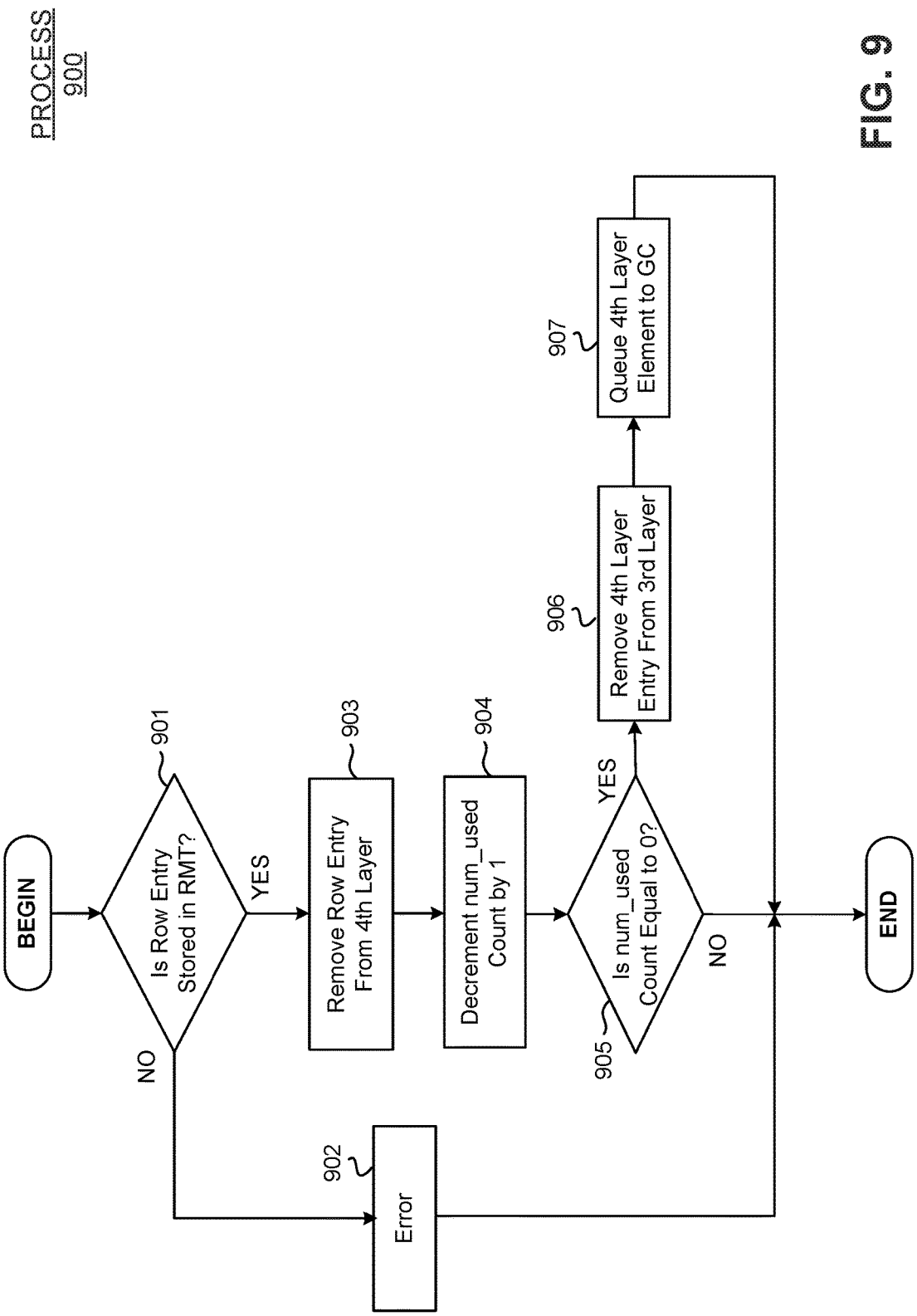
FIG. 9 depicts a flow chart of an example process embodiment configured for deleting rows from a row cache memory according to the techniques described in the present disclosure.

Deleting rows from the row mapping table basically occurs in reverse order as shown in FIG. 9, which depicts a flow chart of an example process embodiment configured for deleting rows from a row cache memory according to the techniques described in the present disclosure. In the illustrated embodiment, process 900 begins at operation 901 by determining if a row entry to be deleted is stored in the row mapping table. If not, an error is generated (operation 902) and the process completes.

If the row entry to be deleted is stored in the row mapping table, the row entry from the fourth layer is first removed (operation 903) and the num_used count is decremented by 1 (operation 904). Process 900 continues by determining if the num_used count has been decremented all the way down to 0 (operation 905). If not, process 900 completes. If the num_used count has been decremented to 0, the fourth layer entry is removed from the third layer of the row mapping table (operation 906) and the fourth layer element is queued to the garbage collector ("GC"), which ultimately will deallocate the memory used for the fourth layer of the row mapping table.

When a row is removed from the row cache and packed into the page buffer cache, its entry from the corresponding RMAP_PAGE can be nullified. And if it were the only allocated entry in that RMAP_PAGE, the RMAP_PAGE can be deallocated and its entry in the RMAP_EXT data structure can be nullified. Similarly, when the last entry from an RMAP_EXT is nullified, the RMAP_EXT can be deallocated and its entry in the RMAP_AU data structure can be nullified, and so on. For purposes of brevity, we only include the case of deallocation of RMAP_PAGE. The same technique can be applied equally for the deallocation of the RMAP_EXT and RMAP_AU data structures in the row mapping table.

Pseudo code for the concurrency control embodiments is included in Appendix A at the end of this disclosure. This completes process 900 according to one illustrative embodiment.

As discussed above, at the outset the pointer values stored in this first layer may be set to NULL. This first layer can be the database layer, e.g., RMAP_DB. There can be one pointer entry in the database layer element for every allocation unit in the database. In one embodiment, there may be $2^{24}$ allocation units allocated in the database layer.

In at least certain embodiments, for improved space utilization in the row cache-enabled database designed according to the techniques described in this disclosure, the first layer array RMAP_DB, which may include $2^{24}$ entries, can be allocated at the time of creation of the database or at the start of recovery of the database at boot time. At $2^{24}$ times 8 bytes, equal to 128 MB, this is the largest chunk of memory needed to implement the row mapping table. Pseudo code for implementing the various data structures used in implementing the row mapping table and for inserting an entry into the row mapping table are included in Appendix A at the end of this disclosure.

III. Exemplary Hardware Implementation

Embodiments of the present disclosure may be practiced using various computer systems including hand-held devices, microprocessor systems, programmable electronics, laptops, tablets and the like. The embodiments can also be practiced in distributed computing environments where tasks are performed by remote processing devices that are linked through one or more wire-based or wireless networks.

Figure 10:
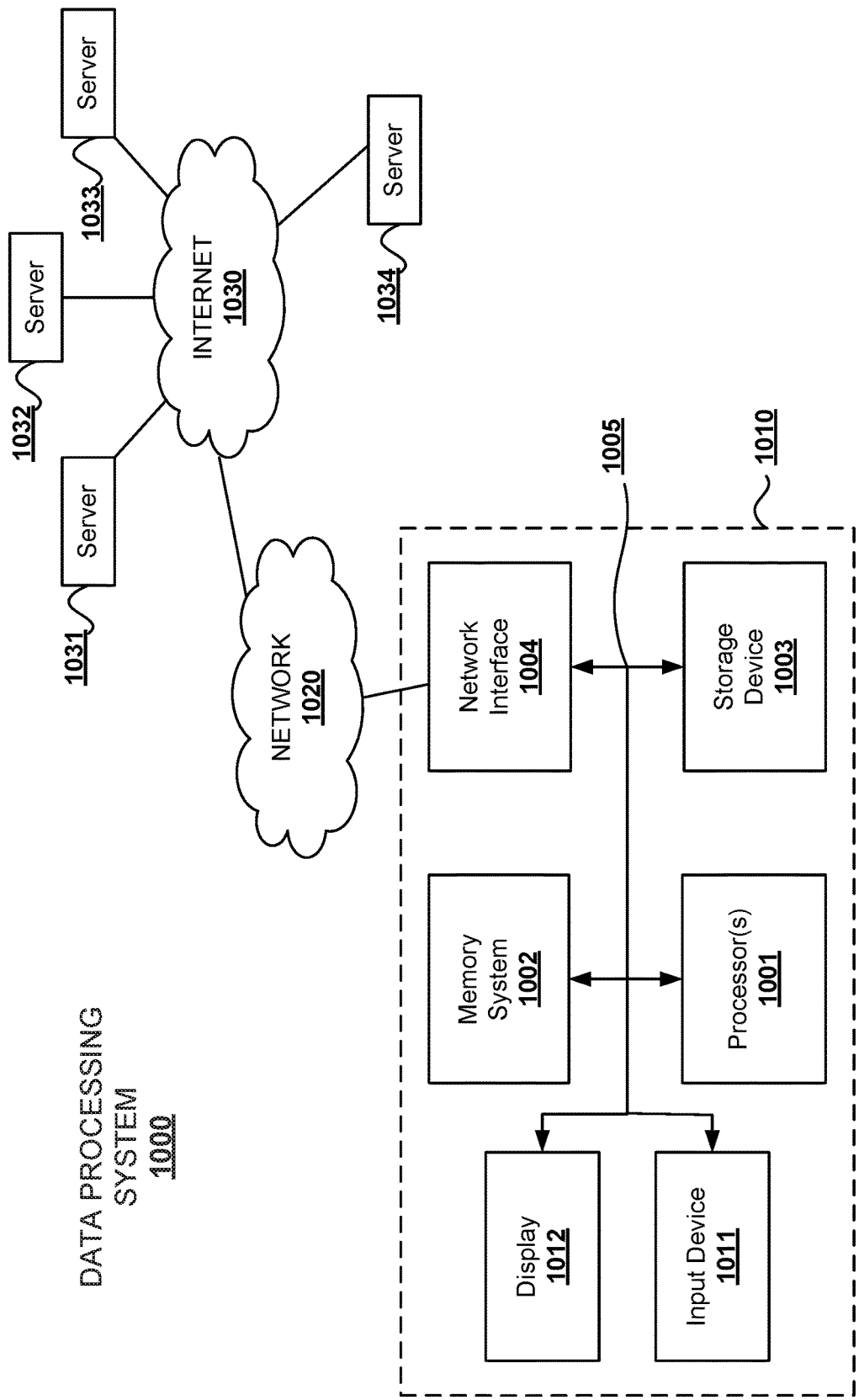
FIG. 10 depicts an example overview block diagram of a data processing system upon which the embodiments described in the present disclosure may be implemented.

FIG. 10 depicts an example overview block diagram of a data processing system upon which the embodiments described herein may be implemented. It is to be understood that a variety of computers configurations may be used to implement the described techniques. While FIG. 10 illustrates various components of a data processing system 1000, it is not intended to represent any particular architecture or manner of interconnecting components. It will also be appreciated that network computers and other data processing systems, which have fewer components or additional components, may be used. The data processing system 1000 may, for example, comprise a personal computer (PC), workstation, laptop computer, tablet, smartphone or other hand-held wireless device, or any device having similar functionality.

In the illustrated embodiment, data processing system 1000 includes a computer system 1010. Computer system 1010 includes an interconnect bus 1005 (or other communication mechanism for communicating information) and one or more processor(s) 1001 coupled with the interconnect bus 1005 for processing information. Computer system 1010 also includes a memory system 1002 coupled with the one or more processors 1001 via the interconnect bus 1005. Memory system 1002 is configured to store information and instructions to be executed by processor 1001, including information and instructions for performing the techniques described above. This memory system may also be used for storing programs executed by processor(s) 1001. Possible implementations of this memory system may be, but are not limited to, random access memory (RAM), read only memory (ROM), or combination thereof.

In the illustrated embodiment, a storage device 1003 is also provided for storing information and instructions. Typically storage device 1003 comprises nonvolatile memory. Common forms of storage devices include, for example, a hard drive, a magnetic disk, an optical disk, a CD-ROM, a DVD, a flash or other non-volatile memory, a USB memory card, or any other computer-readable medium from which a computer can read data and instructions. Storage device 1003 may store source code, binary code, or software files for performing the techniques above. In addition, while FIG. 10 shows that storage device 1003 as a local device connected with the components of the data processing system, it will be appreciated by skilled artisans that the described techniques may use a storage device remote from the system, such as a database or other network storage device coupled with the computer system 1010 through a network interface such as network interface 1004.

Network interface 1004 may provide communications between computer system 1010 and a network 1020. The network interface 1004 may be a wireless or wired connection, or any combination thereof. Computer system 1010 is configured to send and receive information through the network interface 1004 across one or more networks 1020 such as a local area network (LAN), wide-area network (WAN), wireless or Bluetooth network, or the Internet 1030, etc. Computer system 1010 may access data and features on systems residing on one or multiple different hardware servers 1031-1034 across the network 1020. Hardware servers 1031-1034 and associated server software may also reside in a cloud computing environment.

Storage device and memory system are both examples of non-transitory computer readable storage media. Embodiments herein can be embodied in computer-readable code stored on any computer-readable medium, which when executed by a computer or other data processing system, can be adapted to cause the system to perform operations according to the techniques described herein. Computer-readable media may include any mechanism that stores information in a form accessible by a data processing system such as a computer, network device, tablet, smartphone, or any device having similar functionality. Examples of computer-readable media include any type of non-transitory, tangible media capable of storing information thereon, including floppy disks, hard drive disks ("HDDs"), solid-state devices ("SSDs") or other flash memory, optical disks, digital video disks ("DVDs"), CD-ROMs, magnetic-optical disks, ROMs, RAMs, erasable programmable read only memory ("EPROMs"), electrically erasable programmable read only memory ("EEPROMs"), magnetic or optical cards, or any other type of media suitable for storing data and instructions in an electronic format. Computer-readable media can also be distributed over a network-coupled computer system stored and executed in a distributed fashion.

Further, computer system 1010 may be coupled via interconnect bus 1005 to a display 1012 for displaying information to a computer user. An input device 1011 such as a keyboard, touchscreen, and/or mouse is coupled to bus 1005 for communicating information and command selections from the user to processor 1001. The combination of these components allows the user to communicate with the system. In some systems, bus 1005 represents multiple specialized interconnect buses.

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a computer system. The techniques may be carried out in a computer system or other data processing system in response executing sequences of instructions stored in memory.

Throughout the foregoing description, for the purposes of explanation, numerous specific details were set forth in order to provide a thorough understanding of the disclosure. It will be apparent, however, to persons skilled in the art that these embodiments may be practiced without some of these specific details. The above examples and embodiments should not be deemed to be the only embodiments, and are presented to illustrate the flexibility and advantages of the present disclosure. Other arrangements, embodiments, implementations and equivalents will be evident to those skilled in the art and may be employed without departing from the spirit and scope of the disclosure as defined by the following claims.

APPENDIX A

EXAMPLE PSEUDO CODE FOR
ROW MAPPING TABLE CONFIGURATION
AND OPERATIONS

PSUEDO CODE FOR DATA STRUCTURES USED IN IMPLEMENTING THE
ROW MAPPING TABLE

```
/*
** Definitions of the elements of RMAP TABLE.
** Note: For simplicity, the number of entries in RMAP_PAGE has been fixed
** to 4096 and is not kept as variable depending on the maximum number of rows
** that can fit into a database page for this partition.
*/
typedef struct rmap_page
{
   int64            num_used;
   IMRS_ROW *       imrs_rowp[4096];
} RMAP_PAGE;
typedef struct rmap_ext
{
   RMAP_PAGE *      rmap_pagep[8];
} RMAP_EXT;
typedef struct rmap_au
{
   RMAP_EXT *       rmap_extp[32];
} RMAP_AU;
typedef struct rmap_db
{
   RMAP_AU *        rmap_aup[2^24];
} RMAP_DB;
typedef sruct row_id
{
   int32            pageid;
   int16            rnum;
} RowID;
```

APPENDIX A-continued

EXAMPLE PSEUDO CODE FOR
ROW MAPPING TABLE CONFIGURATION
AND OPERATIONS

PSUEDO CODE FOR INSERTION OF ENTRY INTO ROW MAPPING TABLE

```
/*
** Simple routine to add a row entry from the RMAP table.
** Concurrency case not considered here for sake of simplicity.
*/
void
rmap_insert(RMAP_DB *rmap_db, RowID *ridp, IMRS_ROW *imrs_rowp)
{
  /* Extract the AU#, EXT#, PAGE#, ROW# from ROWID */
  EXTRACT_INFO_FROM_RID(ridp, &au_no, &ext_no, &page_no, &row_no);
  /* Allocate the required RMAP_AU if not already allocated */
  if (!(rmap_au = rmap_db->rmap_aup[au_no]))
  {
    rmap_au = mem_alloc(sizeof(RMAP_AU));
    /* Corresponding entry in RMAP_DB points to this RMAP_AU */
    rmap_db->rmap_aup[au_no] = rmap_au;
  }
  /* Allocate the required RMAP_EXT if not already allocated */
  if (!(rmap_ext = rmap_au->rmap_extp[ext_no])
  {
    rmap_ext = mem_alloc(sizeof(RMAP_EXT));
    /* Corresponding entry in RMAP_AU points to this RMAP_EXT */
    rmap_au->rmap_extp[ext_no] = rmap_ext;
  }
  /* Allocate the required RMAP_PAGE if not already allocated */
  if (!(rmap_page = rmap_ext->rmap_pagep[page_no]))
  {
    rmap_page = mem_alloc(sizeof(RMAP_PAGE));
    /* Corresponding entry in RMAP_EXT points to this RMAP_PAGE */
    rmap_ext->rmap_pagep[page_no] = rmap_page;
  }
  /* Corresponding entry in RMAP_PAGE points to the row in IMRS */
  rmap_page->imrs_rowp[row_no] = imrs_rowp;
  /* Increment the count of number of entries in RMAP_PAGE */
  rmap_page->num_used++;
  return;
}
```

PSUEDO CODE FOR SEARCHING A ROW MAPPING TABLE

```
/*
** Given a RowID, this routine provides the address of the row in in-memory row store
** ("IMRS") if it is present in IMRS, else return NULL.
*/
IMRS_ROW *
rmap_search(RMAP_DB *rmap_db, RowID *ridp)
{
  /*
  ** Perform bitwise operation to extract allocation unit#,
  ** extent# within the allocation unit, Page# within the extent and
  ** row# within the page from a given RowID.
  */
  EXTRACT_INFO_FROM_RID(ridp, &au_no, &ext_no, &page_no, &row_no);
  if ( !rmap_db
     || !(rmap_au = rmap_db->rmap_aup[au_no])
     || !(rmap_ext = rmap_au->rmap_extp[ext_no])
     || !(rmap_page = rmap_ext->rmap_pagep[page_no])
     || !(rowptr = rmap_page->imrs_rowp[row_no])
     )
  {
    return NULL;
  }
  return rowptr;
}
```

PSUEDO CODE FOR DELETION OF ENTRY FROM ROW MAPPING TABLE

```
/*
** Simple routine to delete a row entry from the RMAP table.
** The concurrency case is not considered here for sake of simplicity.
*/
void
rmap_delete(RMAP_DB *rmap_db, RowID *ridp)
```

APPENDIX A-continued

EXAMPLE PSEUDO CODE FOR
ROW MAPPING TABLE CONFIGURATION
AND OPERATIONS

```
{
  /* Extract the AU#, EXT#, PAGE#, ROW# from ROWID */
  EXTRACT_INFO_FROM_RID(ridp, &au_no, &ext_no, &page_no, &row_no);
  /*
  ** Get to the rmap_page containing the entry for the row
  ** while getting the pointers to the RMAP_AU and RMAP_EXT
  ** on the way.
  */
  rmap_au = rmap_db->rmap_aup[au_no];
  rmap_ext = rmap_au->rmap_extp[ext_no];
  rmap_page = rmap_ext->rmap_pagep[page_no];
  /* Mark the entry corresponding the row as NULL */
  rmap_page->imrs_rowp[row_no] = NULL;
  /* Decrement the number of entries in the RMAP_PAGE. */
  rmap_page->num_used--;
  /*
  ** Deallocate the RMAP_PAGE if the number of entries in it is nil
  ** and nullify its entry in RMAP_EXT.
  */
  if (rmap_page->num_used == 0)
  {
     rmap_ext->rmap_pagep[page_no] = NULL;
     mem_free(rmap_page);
  }
  return;
}
```

PSUEDO CODE FOR CONCURRENCY CONTROL ALGORITHM FOR
ROW MAPPING TABLE

```
/*
2    ** Macros to insert or remove entry from RMAP Table when adding or
3    ** removing row from IMRS
4    */
5    #define RMAP_INSERT(rmap_db, ridp, imrs_rowp)               \
6            rmap_update(rmap_db, ridp, imrs_rowp, RMAP_INSERT)
7    #define RMAP_DELETE(rmap_db, ridp, imrs_rowp)               \
8            rmap_update(rmap_db, ridp, imrs_rowp, RMAP_DELETE)
9
10
11   /* routine to add or remove a row entry from the RMAP table. */
12   void
13   rmap_update(RMAP_DB *rmap_db, RowID *ridp, IMRS_ROW *imrs_rowp,
     int optype)
14   {
15       /* Extract the AU#, EXT#, PAGE#, ROW# from ROWID */
16       EXTRACT_INFO_FROM_RID(ridp, &au_no, &ext_no, &page_no, &row_no);
17
18       /* Allocate the RMAP_AU if not already allocated */
19       if (!(rmap_au = rmap_db->rmap_aup[au_no]))
20       {
21          rmap_au = mem_alloc(sizeof(RMAP_AU));
22
23          /*
24          ** Try to put its pointer in the RMAP_DB, if some other
25          ** insert operation arrives first, deallocate it.
26          */
27          if (!CAS(&rmap_db->rmap_aup[au_no], NULL, rmap_au))
28          {
29             memfree(rmap_au);
30             rmap_au =rmap_db->rmap_aup[au_no];
31          }
32       }
33
34       /* Allocate the RMAP_EXT if not already allocated */
35       if (!(rmap_ext = rmap_au->rmap_extp[ext_no])
36       {
37          rmap_ext = mem_alloc(sizeof(RMAP_EXT));
38
39          /*
40          ** Try to put its pointer in the RMAP_AU, if some other
41          ** insert operation arrives first, deallocate it.
42          */
43          if (!CAS(&rmap_au->rmap_extp[ext_no], NULL, rmap_ext))
```

APPENDIX A-continued

EXAMPLE PSEUDO CODE FOR
ROW MAPPING TABLE CONFIGURATION
AND OPERATIONS

```
44         {
45            memfree(rmap_ext);
46            rmap_ext = rmap_au->rmap_extp[ext_no];
47         }
48      }
49
50   get_rmap_page:
51      /* Allocate the required RMAP_PAGE if not already allocated */
52      if (!(rmap_page = rmap_ext->rmap_pagep[page_no]))
53      {
54         rmap_page = mem_alloc(sizeof(RMAP_PAGE));
55
56         /*
57         ** Set the used count in it as equal to 1. This will prevent
58         ** RMAP_PAGE from being deallocated after its pointer is installed
59         ** in the RMAP_EXT, and before the IMRS
60         ** row's pointer entry is stored in it.
61         */
62         rmap_page->num_used = 1;
63
64         /*
65         ** Attempt to put the RMAP_PAGE's pointer in the RMAP_EXT, if
66         ** some other insert operation arrives first, deallocate it.
67         */
68         if (!CAS(&rmap_ext->rmap_pagep[page_no], NULL, rmap_page))
69         {
70            memfree(rmap_page);
71            rmap_page = rmap_ext->rmap_pagep[page_no];
72         }
73         else
74         {
75            rmap_page_installed = TRUE;
76         }
77      }
78
79      /* If the operation is an insert into row mapping table */
80      if (optype == RMAP_INSERT)
81      {
82         /*
83         ** Increment the used count in RMAP_PAGE only if we have not
84         ** allocated the RMAP_PAGE in the previous step.
85         ** Note: If the allocation of RMAP_PAGE is done,
86         ** the entry in RMAP_PAGE is already accounted for.
87         */
88         if (!rmap_page_installed)
89         {
90   insert_into_rmap_page:
91            used = rmap_page->num_used;
92
93            /*
94            ** While incrementing the used count, if at any point in time,
95            ** the used count becomes zero, the RMAP_PAGE
96            ** is queued to the garbage collector by some delete operator and
97            ** retry allocating a new RMAP_PAGE.
98            */
99            if (used == 0)
100           {
101              goto get_rmap_page;
102           }
103
104           if (!CAS(&rmap_page->num_used, used, used + 1))
105           {
106              goto insert_into_rmap_page;
107           }
108        }
109
110        /* Finally, put the IMRS row pointer entry in the RMAP_PAGE */
111        rmap_page->imrs_rowp[row_no] = imrs_rowp;
112     }
113     /* Else if the operation to be performed is a delete operation */
114     else if (optype == RMAP_DELETE)
115     {
116        /*
117        ** Remove the row entry from the RMAP_PAGE before decrementing
118        ** the used_count in it. Whatever process decrements
119        ** the used_count to zero, is tacked with queuing the
```

APPENDIX A-continued

EXAMPLE PSEUDO CODE FOR
ROW MAPPING TABLE CONFIGURATION
AND OPERATIONS

```
120        ** RMAP_PAGE to garbage collector.
121        */
122        if (!CAS(&rmap_page->imrs_rowp[row_no], imrs_rowp, NULL))
123        {
124           return FAILURE;
125        }
126
127        /*
128        ** Decrement the used_count by 1.
129        ** If the used_count becomes 0, queue the RMAP_PAGE to
130        ** the garbage collector and remove the entry of this RMAP_PAGE
131        ** from the RMAP_EXT.
132        ** Note: Once, the used_count becomes zero, the concurrent inserter
133        ** on this page would not be able to insert into this page and would
134        ** also not be able to allocate their own RMAP_PAGE until
135        ** its entry from the RMAP_EXT is nullified.
136        ** This takes care of the inserter-deleter concurrency.
137        */
138        if (ATOMIC_ADD(&rmap_page->num_used, -1) == 0)
139        {
140           /*
141           ** Instead of directly freeing up the rmap_page here,
142           ** the rmap_page is queued to GC and the GC deallocates
143           ** this rmap_page only when all the accessing processes of this
144           ** rmap_page go offline.
145           */
146           QUEUE_TO_GC(rmap_page);
147
148           rmap_ext->rmap_pagep[page_no] = NULL;
149        }
150     }
151
152     return;
153  }
```

What is claimed is:

1. A method in a database system comprising a database server in communication with a database, the method comprising:
receiving a first query from a client system via a network, the first query comprising a first key and a first operation to be performed on data stored in the database;
scanning an index of the database using the first key to obtain a row identifier for a row to be accessed in the database for the operation to be performed;
converting the row identifier of the row to be accessed in the database into a row address of the row in a first cache memory using a row mapping table comprising a multi-layer data structure stored in a memory of the database server, wherein the first cache memory is configured to store recently accessed rows of the database;
determining whether the row is located in the first cache memory based on the row address; and
performing the operation on the row and storing a result of the operation into the first cache memory at the row address when the row is located in the first cache memory,
wherein converting the row identifier into the row address of the row in the first cache memory comprises:
segmenting the row identifier into at least a first part and a second part;
performing a first comparison at a first layer data structure of the row mapping table, the first comparison comprising comparing bits of the first part of the row identifier with bits of a corresponding first part of the row address stored at the first layer data structure of the row mapping table;
performing a second comparison at a second layer data structure of the row mapping table, the second comparison comprising comparing bits of the second part of the row identifier with bits of a corresponding second part of the row address stored at the second layer data structure of the row mapping table; and
identifying the row address of the row in the first cache memory based on the first comparison and the second comparison.

2. The method of claim 1 wherein a number of comparisons performed while converting the row identifier into the row address of the row in the first cache memory is capped by a number of layers of the multi-layer data structure of the row mapping table.

3. The method of claim 2 wherein the number of comparisons to perform the operation is capped by a number of layers of the multi-layer data structure of the row mapping table.

4. The method of claim 1 wherein a single row mapping table is configured to access one or more row data objects, page data objects, and lock data objects.

5. The method of claim 1 further comprising:
receiving a second query from a client system via the network, the second query comprising a second key and a second operation to be performed on data stored in the database;
scanning an index of the database using the second key to obtain a row identifier for a page to be accessed in the database for the operation to be performed;
converting the page identifier of the page to be accessed in the database into a page address of the page in a second cache memory using the row mapping table;

determining whether the page is located in the second cache memory based on the page address; and performing the operation on the page when the page is located in the second cache memory.

6. The method of claim 5 wherein the first key and the second key are not stored in the row mapping table.

7. The method of claim 5 wherein the first cache memory and the second cache memory are in-memory data structures stored in the memory of the database server.

8. The method of claim 1 wherein a first part of the row identifier comprises a first plurality of bits configured to identify a page number of a page in the database and a second part of the row identifier comprises a second plurality of bits configured to identify a row number of the row to be accessed within the page.

9. The method of claim 1 wherein data stored in the database is segmented into a plurality of allocation units, each allocation unit storing pointers to a plurality of sets of pages, each set of pages storing pointers to a plurality of pages, and each page storing pointers to a plurality of rows of the database.

10. The method of claim 1 wherein concurrency control for data access operations is handled by compare and swap utilizing a retry mechanism.

11. The method of claim 10 wherein the row mapping table of the database system provides a lockless mapping mechanism.

12. The method of claim 1 further comprising managing conflicts between concurrent accesses to the rows in the first cache memory by maintaining a count for each entry at each layer of the row mapping table indicating the number of entries allocated therein, wherein the count is incremented when new rows are added to the first cache memory and is decremented when rows are removed from the first cache memory.

13. A database system of comprising:
a database server in communication with a database via one or more communication mediums, the database server comprising a processor and a system memory configured to store programmed computer code, which when executed by the processor, causes the processor to perform operations comprising:
receiving a first query from a client system via a network, the first query comprising a first key and a first operation to be performed on data stored in the database;
scanning an index of the database using the first key to obtain a row identifier for a row to be accessed in the database for the operation to be performed;
converting the row identifier of the row to be accessed in the database into a row address of the row in a first cache memory using a row mapping table comprising a multi-layer data structure stored in a memory of the database server, wherein the first cache memory is configured to store recently accessed rows of the database;
determining whether the row is located in the first cache memory based on the row address; and
performing the operation on the row and storing a result of the operation into the first cache memory at the row address when the row is located in the first cache memory,
wherein converting the row identifier into the row address of the row in the first cache memory comprises:
segmenting the row identifier into at least a first part and a second part;
performing a first comparison at a first layer data structure of the row mapping table, the first comparison comprising comparing bits of the first part of the row identifier with bits of a corresponding first part of the row address stored at the first layer data structure of the row mapping table;
performing a second comparison at a second layer data structure of the row mapping table, the second comparison comprising comparing bits of the second part of the row identifier with bits of a corresponding second part of the row address stored at the second layer data structure of the row mapping table; and
identifying the row address of the row in the first cache memory based on the first comparison and the second comparison.

14. The database system of claim 13 wherein a number of comparisons performed while converting the row identifier into the row address of the row in the first cache memory is capped by a number of layers of the multi-layer data structure of the row mapping table.

15. The database system of claim 14 wherein the number of comparisons to perform the operation is capped by a number of layers of the multi-layer data structure of the row mapping table.

16. The database system of claim 13 wherein a single row mapping table is configured to access one or more row data objects, page data objects, and lock data objects.

17. The database system of claim 13 wherein the operations further comprise:
receiving a second query from a client system via the network, the second query comprising a second key and a second operation to be performed on data stored in the database;
scanning an index of the database using the second key to obtain a row identifier for a page to be accessed in the database for the operation to be performed;
converting the page identifier of the page to be accessed in the database into a page address of the page in a second cache memory using the row mapping table;
determining whether the page is located in the second cache memory based on the page address; and
performing the operation on the page when the page is located in the second cache memory.

18. The database system of claim 13 wherein concurrency control for data access operations is handled by compare and swap utilizing a retry mechanism.

19. The database system of claim 13 wherein the operations further comprise managing conflicts between concurrent accesses to the rows in the first cache memory by maintaining a count for each entry at each layer of the row mapping table indicating the number of entries allocated therein, and wherein the count is incremented when new rows are added to the first cache memory and is decremented when rows are removed from the first cache memory.

20. A non-transitory computer readable storage medium embodying programmed computer code, which when executed by at least one processor, causes the processor to perform operations in a database system comprising a database server in communication with a database, the operations comprising:
receiving a first query from a client system via a network, the first query comprising a first key and a first operation to be performed on data stored in the database;
scanning an index of the database using the first key to obtain a row identifier for a row to be accessed in the database for the operation to be performed;
converting the row identifier of the row to be accessed in the database into a row address of the row in a first cache memory using a row mapping table comprising a multi-layer data structure stored in a memory of the database server, wherein the first cache memory is configured to store recently accessed rows of the database;

determining whether the row is located in the first cache memory based on the row address; and performing the operation on the row and storing a result of the operation into the first cache memory at the row address when the row is located in the first cache memory, wherein converting the row identifier into the row address of the row in the first cache memory comprises:

segmenting the row identifier into at least a first part and a second part;

performing a first comparison at a first layer data structure of the row mapping table, the first comparison comprising comparing bits of the first part of the row identifier with bits of a corresponding first part of the row address stored at the first layer data structure of the row mapping table;

performing a second comparison at a second layer data structure of the row mapping table, the second comparison comprising comparing bits of the second part of the row identifier with bits of a corresponding second part of the row address stored at the second layer data structure of the row mapping table; and identifying the row address of the row in the first cache memory based on the first comparison and the second comparison.

21. The non-transitory computer readable storage medium of claim 20 wherein a number of comparisons performed while converting the row identifier into the row address of the row in the first cache memory is capped to a number of layers of the multi-layer data structure of the row mapping table.

22. The non-transitory computer readable storage medium of claim 20 wherein a single row mapping table is configured to access one or more row data objects, page data objects, and lock data objects.

23. The non-transitory computer readable storage medium of claim 20 wherein concurrency control for data access operations is handled by compare and swap utilizing a retry mechanism.

* * * * *